United States Patent
Akiyama et al.

(10) Patent No.: US 8,472,810 B2
(45) Date of Patent: Jun. 25, 2013

(54) OPTICAL SIGNAL TRANSMITTER AND METHOD FOR CONTROLLING POLARIZATION MULTIPLEXED OPTICAL SIGNAL

(75) Inventors: Yuichi Akiyama, Kawasaki (JP); Noriaki Mizuguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 346 days.

(21) Appl. No.: 12/839,102

(22) Filed: Jul. 19, 2010

(65) Prior Publication Data

US 2011/0026935 A1    Feb. 3, 2011

(30) Foreign Application Priority Data

Jul. 28, 2009    (JP) .................... 2009-175212

(51) Int. Cl.
*H04B 10/04*    (2006.01)
(52) U.S. Cl.
USPC ............. 398/184; 398/65; 398/183; 398/185; 398/188; 398/198
(58) Field of Classification Search
USPC .................................................. 398/184–201
See application file for complete search history.

(56) References Cited

U.S. PATENT DOCUMENTS

| | | | |
|---|---|---|---|
| 6,819,872 | B2 | 11/2004 | Farries et al. |
| 2005/0286904 | A1* | 12/2005 | Calabro et al. ................ 398/152 |
| 2006/0222371 | A1* | 10/2006 | Izumi ............................ 398/159 |
| 2007/0177882 | A1* | 8/2007 | Akiyama ....................... 398/185 |
| 2007/0297796 | A1* | 12/2007 | Calabro et al. ................. 398/43 |
| 2008/0170862 | A1 | 7/2008 | Vassilieva et al. |
| 2008/0170864 | A1* | 7/2008 | Nishihara et al. ............. 398/188 |
| 2010/0021166 | A1* | 1/2010 | Way ................................ 398/79 |
| 2010/0067914 | A1* | 3/2010 | Tanaka et al. ................. 398/102 |
| 2010/0080571 | A1* | 4/2010 | Akiyama et al. .............. 398/184 |
| 2010/0202785 | A1* | 8/2010 | Kawanishi et al. ........... 398/185 |
| 2010/0316326 | A1* | 12/2010 | Sugiyama ......................... 385/3 |

FOREIGN PATENT DOCUMENTS

| | | |
|---|---|---|
| EP | 1 708 389 A2 | 10/2006 |
| EP | 2 164 199 A2 | 3/2010 |
| EP | 2 169 851 A2 | 3/2010 |
| JP | 62-24731 | 2/1987 |
| JP | 2002-344426 | 11/2002 |
| JP | 2008-172714 | 7/2008 |
| JP | 2008-172799 | 7/2008 |
| JP | 2009-63835 | 3/2009 |

OTHER PUBLICATIONS

European Search Report dated Nov. 26, 2010 issued in corresponding European Patent Application 10169820.7.

* cited by examiner

*Primary Examiner* — Li Liu
(74) *Attorney, Agent, or Firm* — Staas & Halsey LLP

(57) ABSTRACT

An optical signal transmitter includes: first outer modulator to generate first modulated optical signal, the first outer modulator including a pair of optical paths and a first phase shifter to give phase difference to the pair of optical paths; second outer modulator to generate second modulated optical signal, the second outer modulator including a pair of optical paths and a second phase shifter to give phase difference to the pair of optical paths; combiner to generate polarization multiplexed optical signal by combining the first and second modulated optical signals; phase controller to control the phase difference by the first phase shifter to $A-\Delta\phi$ and control the phase difference by the second phase shifter to $A+\Delta\phi$; and power controller to control at least one of the first and second outer modulators based on AC component of the polarization multiplexed optical signal.

11 Claims, 20 Drawing Sheets

LD : LIGHT SOURCE
PBC : POLARIZATION BEAM COMBINER

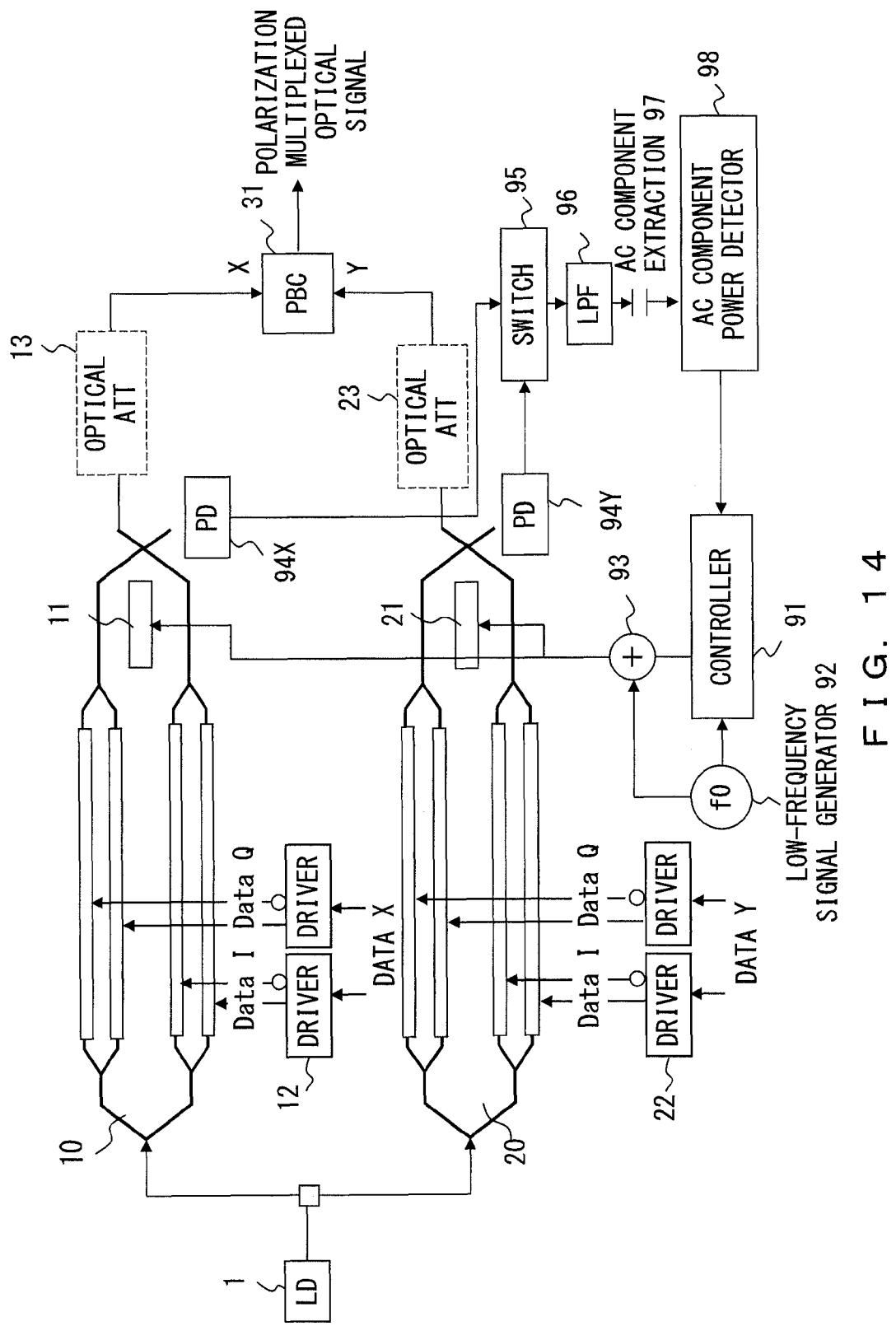
F I G. 1 4

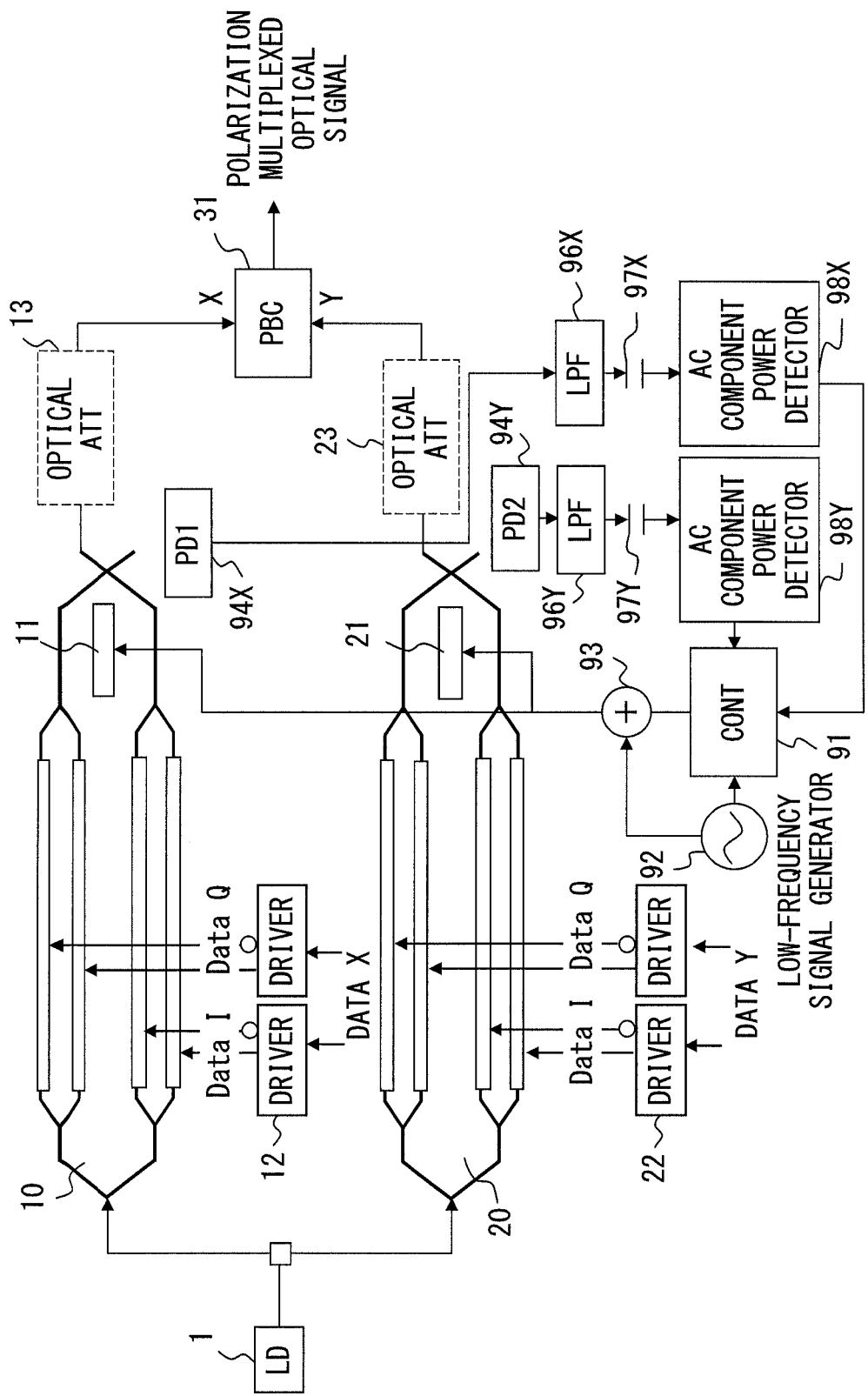
F I G. 15

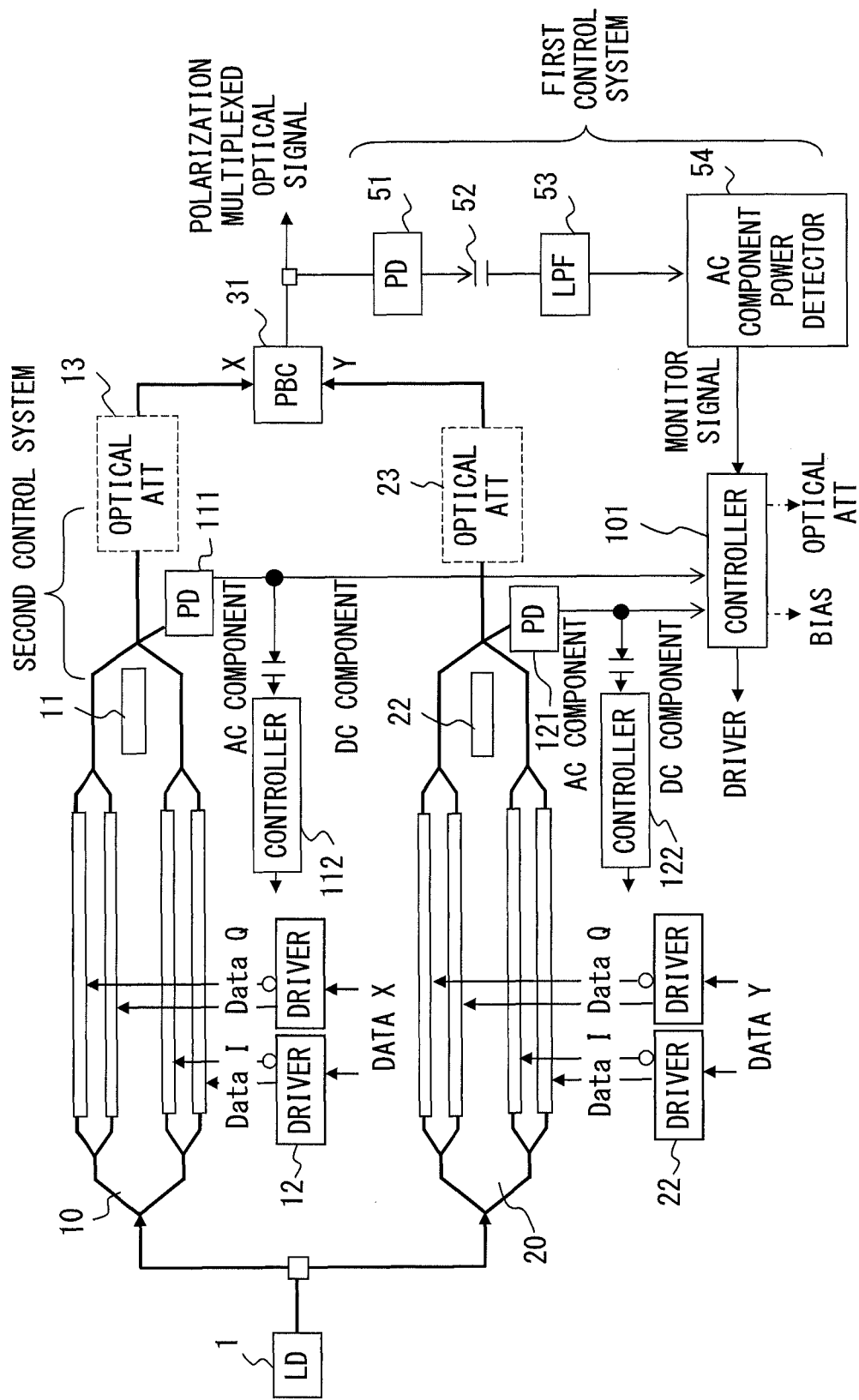
F I G. 17

OPTICAL SIGNAL TRANSMITTER AND METHOD FOR CONTROLLING POLARIZATION MULTIPLEXED OPTICAL SIGNAL

CROSS-REFERENCE TO RELATED APPLICATIONS

This application is based upon and claims the benefit of priority of the prior Japanese Patent Application No. 2009-175212, filed on Jul. 28, 2009, the entire contents of which are incorporated herein by reference.

FIELD

The present invention relates an optical signal transmitter and a method for controlling polarization multiplexed optical signal. The invention may be applied to, for example, an optical signal transmitter used in a polarization multiplexed transmission system.

BACKGROUND

The needs for super high speed transmission systems with a speed of more than 40 Gbit/s (for example, 100 Gbit/s) have been increasing rapidly. For this reason, development is under way for practical realization of an optical transmission system that adopts a multilevel modulation scheme applied to a radio system (for example, the QPSK modulation using four-level phase modulation). However, as the transmission-signal speed becomes higher, solving problems related to the feasibility of the electric signal circuit and problems related to the degradation of the optical transmission signal (transmission-signal spectrum degradation due to an optical filter and signal degradation due to chromatic dispersion and accumulation of optical noises) becomes more difficult.

As one of techniques for solving these problems, optical polarization multiplexing has attracted attention. A polarization multiplexed optical signal is generated by, for example, an optical signal transmitter illustrated in FIG. 1A. The optical signal transmitter has a light source (LD), a pair of modulators, and a polarization beam combiner (PBC). Continuous wave light output from the light source is spilt and guided to the pair of modulators. The pair of modulators modulate the continuous wave light respectively with corresponding data signal, and generate a pair of modulated optical signals. The polarization beam combiner generates a polarization multiplexed optical signal illustrated in FIG. 1B by combining the pair of modulated optical signals. In other words, in the polarization multiplexing, two data streams are transmitted using two polarized waves (X polarization and Y polarization) that have the same wavelength and are orthogonal to each other.

Accordingly, in the polarization multiplexing, the data speed becomes half, realizing the improvement of the characteristics of the electric-signal generation circuit and reduces the cost, size and power consumption of the circuit. In addition, the characteristics of the optical transmission system as a whole is improved, as influences from quality-degradation factors such as dispersion on the optical transmission path are reduced. Japanese Laid-open Patent Publication No. 62-24731, Japanese Laid-open Patent Publication No. 2002-344426, Japanese Laid-open Patent Publication No. 2008-172799 describe a transmission system using the polarization multiplexing. In addition, as related arts, configurations described in Japanese Laid-open Patent Publication No. 2009-63835 and Japanese Laid-open Patent Publication No. 2008-172714 have been proposed.

However, in an optical signal transmitter that generates a polarization multiplexed optical signal, a modulator is provided for each polarization as illustrated in FIG. 1A. For this reason, differences in the optical power may be generated between the polarization in the polarization multiplexed output signal, due to factors such as manufacturing variability of characteristics between the modulators (for example, loss of the LN modulator) and characteristics of the optical splitter and/or the optical combiner.

SUMMARY

According to an aspect of an invention, an optical signal transmitter includes a first outer modulator to generate a first modulated optical signal, the first outer modulator including a pair of optical paths and a first phase shifter to give a phase difference to the pair of optical paths; a second outer modulator to generate a second modulated optical signal, the second outer modulator including a pair of optical paths and a second phase shifter to give a phase difference to the pair of optical paths; a combiner to generate a polarization multiplexed optical signal by combining the first and second modulated optical signals; a phase controller to control the phase difference by the first phase shifter to $A-\Delta\phi$ and control the phase difference by the second phase shifter to $A+\Delta\phi$ when the first and second outer modulators are driven by first and second control data signals respectively; and a power controller to control at least one of the first and second outer modulators based on an AC component of the polarization multiplexed optical signal when the first and second outer modulators are driven by the first and second control data signals respectively. The data pattern of the first control data signal is same as the second control data signal. The data pattern of the first control data signal may be reversed pattern of the second control data signal.

According to another aspect of an invention, an optical signal transmitter includes: a first light source; a first outer modulator to generate a first modulated optical signal by modulating an optical signal generated by the first light source, the first outer modulator including a pair of optical paths and a first phase shifter to give a phase difference to the pair of optical paths; a second light source; a second outer modulator to generate a second modulated optical signal by modulating an optical signal generated by the second light source, the second outer modulator including a pair of optical paths and a second phase shifter to give a phase difference to the pair of optical paths; a combiner to generate a polarization multiplexed optical signal by combining the first and second modulated optical signals; a phase controller to control the phase difference by the first phase shifter to $A-\Delta\phi$ and control the phase difference by the second phase shifter to $A+\Delta\phi$ when the first and second outer modulators are driven by first and second control data signals respectively; and a power controller to control at least one of the first and second light sources based on an AC component of the polarization multiplexed optical signal when the first and second outer modulators are driven by the first and second control data signals respectively. The data pattern of the first control data signal is same as the second control data signal. The data pattern of the first control data signal may be reversed pattern of the second control data signal.

According to another aspect of an invention, a method for controlling a polarization multiplexed optical signal is used in an optical signal transmitter including a first outer modulator having a pair of optical paths and a first phase shifter to give a phase difference to the pair of optical paths to generate a first modulated optical signal; a second outer modulator having a pair of optical paths and a second phase shifter to give a phase difference to the pair of optical paths to generate a second modulated optical signal; and a combiner to generate the polarization multiplexed optical signal by combining the first and second modulated optical signals. The method includes: controlling the phase difference by the first phase shifter to A−Δϕ; controlling the phase difference by the second phase shifter to A+Δϕ; generating first and second control data signals as drive signals of the first and second outer modulators, respectively; and controlling at least one of the first and second outer modulators based on an AC component of the polarization multiplexed optical signal generated when the first and second outer modulators are driven by the first and second control data signals, respectively. The data pattern of the first control data signal is same as the second control data signal. The data pattern of the first control data signal may be reversed pattern of the second control data signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 through FIG. 16 are diagrams illustrating a method of controlling the phase shifter.

FIG. 17 is a diagram illustrating the configuration of an optical signal transmitter that performs online control.

DESCRIPTION OF EMBODIMENTS

Figure 2:
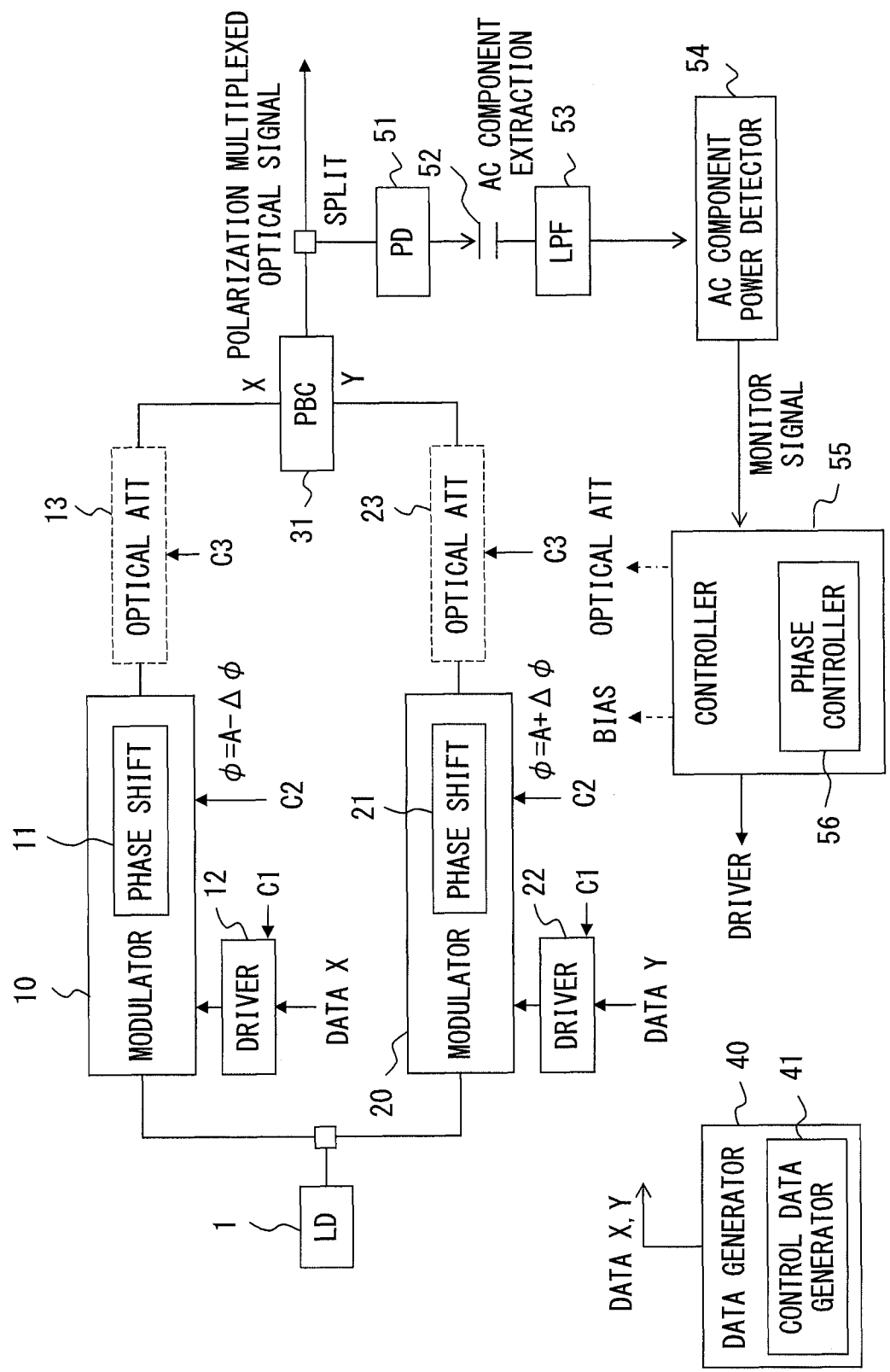
FIG. 2 is a diagram illustrating the configuration of an optical signal transmitter according to an embodiment.

FIG. 2 illustrates the configuration of an optical signal transmitter according to an embodiment. The optical signal transmitter according to the embodiment transmits a polarization multiplexed optical signal obtained by combining first and second modulated optical signals. The polarization multiplexed optical signal carries data to a receiving station using X polarization and Y polarization that are orthogonal to each other. Here, if the power of the X polarization and that of the Y polarization are different from each other, the characteristics of the polarization multiplexed optical signal degrade. Therefore, in the optical signal transmitter according to the embodiment, control is performed to reduce (desirably, to minimize) the power difference between the X polarization and the Y polarization.

The light source (LD) 1 is, for example, a laser diode, and generates an optical signal having a certain frequency. The optical signal is, for example, a continuous wave (CW). The optical signal is split by, for example, an optical splitter and guided to modulators 10 and 20.

The modulators 10 and 20 are, in this example, modulators (for example, Mach-Zehnder LN modulators) by which the power of the output light periodically changes according to the drive voltage. The modulator 10 has a pair of optical paths and a phase shifter 11 that gives a phase difference to the pair of optical paths. The modulator 10 generates a modulated optical signal X by modulating an input optical signal according to data X. In the same manner, the modulator 20 has a pair of optical paths and a phase shifter 21 that gives a phase difference to the pair of optical paths. The modulator 20 generates a modulated optical signal Y by modulating an input optical signal according to data Y.

A driver 12 generates a drive voltage signal representing the data X and gives the signal to the modulator 10 A driver 22 generates a drive voltage signal representing the data Y and gives the signal to the modulator 20. Meanwhile, in order to control the operating point (that is, the bias) of the LN modulators, the modulators 10 and 20 respectively has a bias circuit that is not illustrated in the drawing. The bias circuit is, for example, an ABC (auto bias control) circuit. For example, the ABC circuit applies a low-frequency voltage signal to the corresponding LN modulator, and based on the low-frequency component contained in the output light from the modulators 10 and 20, adjusts the operating point (that is, the DC bias voltage) of the corresponding LN modulator.

Note that the LN modulator is described as an example of the optical modulator herein, this is not a limitation. The optical modulator is not limited to the LN modulator, and may be a modulator using electro-optical materials, for example, a modulator including semiconductor materials such as InP.

Optical attenuators 13 and 23 adjust the power of the modulated optical signals X and Y, respectively. The optical attenuators 13 and 23 are not indispensable constituent elements. In addition, the optical attenuators 13 and 23 may be provided on the input side of the modulators 10 and 20, or may be provided within the modulators 10 and 20, or may be provided on the output side of the modulators 10 and 20.

In the configuration described above, an outer modulator that generates the modulated optical signal X may be configured to include the modulator 10, the driver 12, the bias circuit not illustrated in the drawing, and the optical attenuator 13. Similarly, an outer modulator that generates the modulated optical signal Y may be configured to include the modulator 20, the driver 22, the bias circuit not illustrated in the drawing, and the optical attenuator 23.

Figure 1:
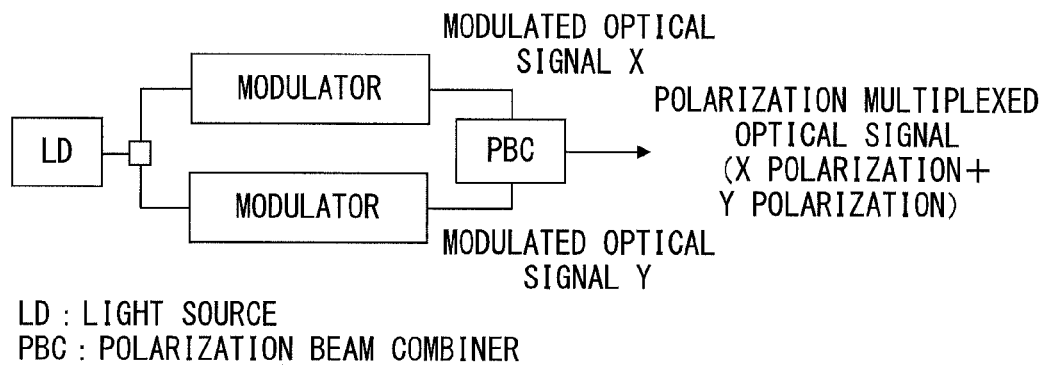
FIG. 1A and FIG. 1B are diagrams illustrating polarization multiplexing.
Figure 1:
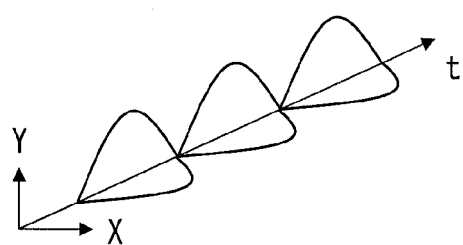

A polarization beam combiner (PBC) 31 generates a polarization multiplexed optical signal by polarization multiplexing the modulated optical signal X and the modulated optical signal Y. Here, in the polarization multiplexing, as illustrated in FIG. 1B, the X polarization and the Y polarization that are orthogonal to each other are used. The modulated optical signal X is propagated using the X polarization, and the modulated optical signal Y is propagated using the Y polarization.

In the configuration described above, when the optical transmitter transmits data, the phase shifters 11 and 21 are controlled so as to generate a phase determined according to the modulation scheme. For example, in QPSK (including DQPSK), the phase $\phi$ of both the phase shifters 11 and 21 is controlled to $\pi/2$. Meanwhile, a data generator 40 generates transmission data X and Y. When the transmission data X and Y are given to the modulators 10 and 20 as the data X and Y respectively, the modulated optical signals X and Y are generated, and polarization multiplexed optical signal that carries the modulated optical signals X and Y are output.

The optical signal transmitter according to the embodiment has the following control system for controlling the power difference between the X polarization and the Y polarization to zero or approximately zero. A photo detector (PD) 51 converts a polarization multiplexed optical signal split by the optical splitter into an electric signal. An AC component extracting device 52 extracts the AC component from the electric signal obtained by the photo detector 51 (or, removes the DC component). A low pass filter 53 removes the symbol frequency component of the data X and Y from the electric signal. An AC component power detector 54 detects the AC component power of the electric signal for which filtering has been performed by the low pass filter 53, and outputs the detection result as a monitor signal. A controller 55 controls at least one of the outer modulators (the modulator, driver, bias circuit, optical attenuator) according to the monitor signal representing the AC component power of the polarization multiplexed optical signal. Note that the low pass filter 53 is provided between the photo detector 51 and the AC component power detector 54 in the example illustrated in FIG. 2, however, an electric circuit having a sufficiently low band with respect to the modulation speed may be provided instead of the low pass filter 53.

When adjusting the power balance of the X polarization and the Y polarization, a control data generator 41 generates control data X and Y. The data pattern of the control data X is the same as the data pattern of the control data Y. The generated control data X and Y are given to the modulators 10 and 20 through the drivers 12 and 22 as the data X and Y, respectively. In other words, while the power balance is adjusted, the modulators 10 and 20 are driven by the same control data.

In addition, when adjusting the power balance between the X polarization and the Y polarization, a phase controller 56 controls the phases of the phase shifter 11 and 21 to "A−Δφ" and "A+Δφ", respectively. In other words, the phase difference "A−Δφ" is given to the pair of optical paths of the modulator 10, and the phase difference "A+Δφ" is given to the pair of optical paths of the modulator 20. Here, "A" is the optimal phase at the time of data transmission, which is, for example, π/2 for QPSK or DQPSK. Meanwhile, "Δφ" is an arbitrary phase other than zero. The phases of the phase shifters 11 and 21 are set so that they are shifted to opposite directions to each other with respect to the optimal phase by the same amount. The phase controller 56 may be provided either in a controller 55 or outside the controller 55.

In the setting described above, the controller 55 generates one or more of control signals C1-C3 so as to reduce (preferably, to minimize) the AC component power of the polarization multiplexed optical signal. To "reduce the AC component power" may be an operation to control the AC component power below a specified threshold value. The control signal C1 controls the amplitude of the drive voltage generated by the drivers 12 and 22. The output power of the modulators 10 and 20 depends on the drive voltage. The output power is high with a large drive amplitude, and the output power is low with a small drive amplitude. The control signal C2 controls the bias of the modulators 10 and 20. The output power of the modulators 10 and 20 depends on the DC bias voltage controlling the bias point. Generally, the output power becomes maximum when the bias is controlled to the optimal point. The control signal C3 controls the attenuation amount of the optical attenuators 13 and 23.

In the setting described above, when the AC component power of the polarization multiplexed optical signal is minimized, while the details are to be described later, the power difference between the X polarization and the Y polarization contained in the polarization multiplexed optical signal is minimized. Therefore, by appropriately generating one or more of the control signal C1 to C3, the power difference between the X polarization and the Y polarization is minimized, improving the characteristics of the polarization multiplexed optical signal.

As described above, the optical signal transmitter according to the embodiment has a feedback system that controls the outer modulator using the AC component power of the polarization multiplexed optical signal, and the feedback system adjusts the power balance between the X polarization and the Y polarization. In other words, without monitoring the power of the modulated optical signals X and Y separately, the power difference between the polarizations are adjusted by monitoring the polarization multiplexed optical signal output from the optical transmitter. This makes it possible to optimize the power balance between the X and Y polarizations based on the actually-output polarization multiplexed optical signal, without depending on the variation in the characteristics of a photo detector that monitors the power of the modulated optical signals X and Y separately, or in the characteristics of the polarization beam combiner.

However, in the control method according to the embodiment, the control data are provided as the data X and Y, and the phases of the phase shifters 11 and 21 are respectively out of the optimal phase. Therefore, the control method is performed when the optical signal transmitter is offline (at the time of system startup, wavelength switching, etc). Then, during data transmission, the optical signal transmitter operates in the state (the drive voltage, bias or attenuation amount) obtained by the feedback control described above. At this time, the phases of the phase shifters 11 and 21 are respectively controlled to the optimal phase.

Figure 3:
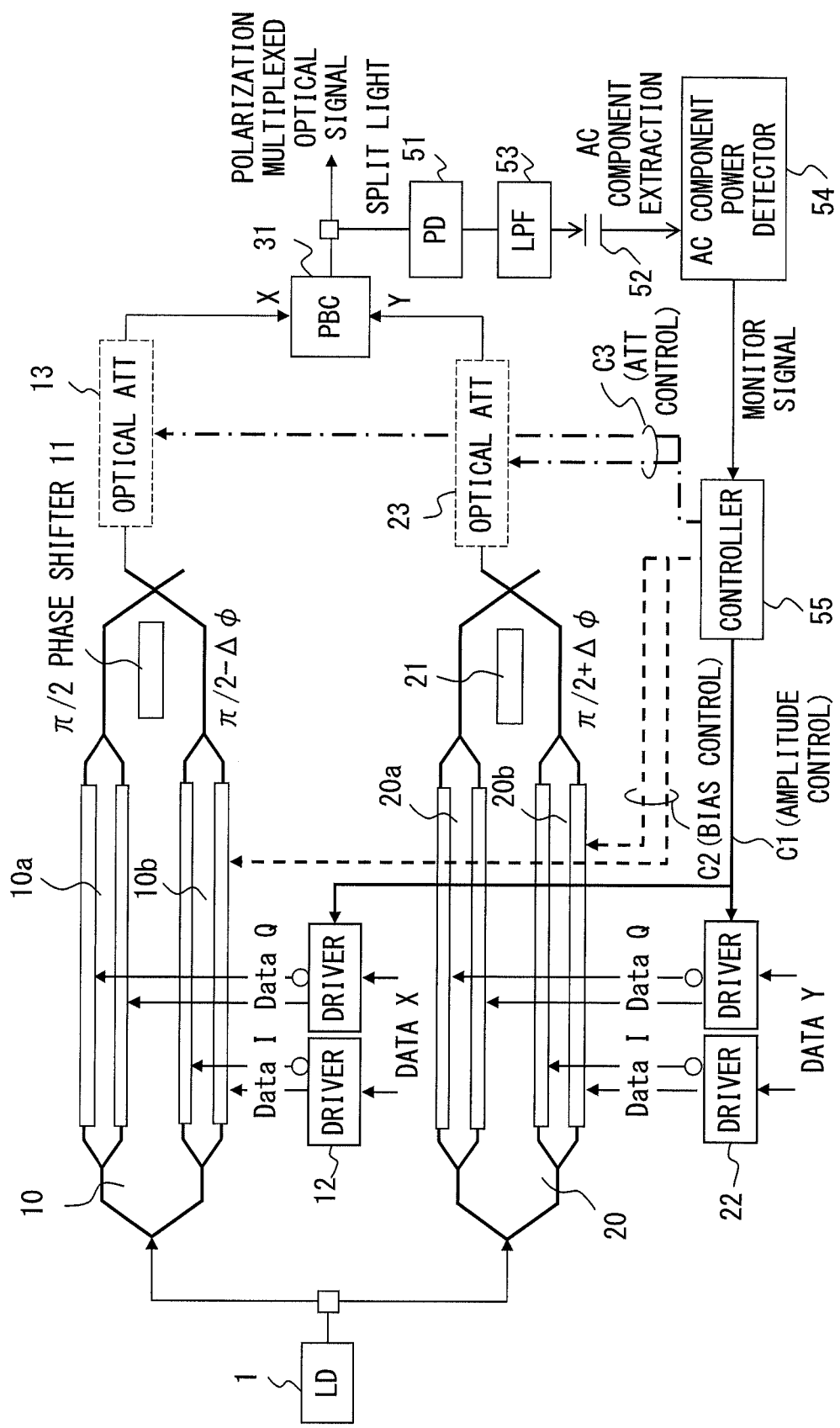
FIG. 3 is a diagram illustrating a first embodiment of an optical signal transmitter.

FIG. 3 is a diagram illustrating a first embodiment of the optical signal transmitter. In this example, data are transmitted in NRZ-DQPSK scheme. The modulation scheme is not limited to QPSK/DQPSK, and may be another DPSK modulation scheme or another multilevel modulation scheme. For example, as disclosed in United States Patent Application No. 2006/0127102, the optical transmitter may be one having an optical modulator that changes the optical phase as vector by performing a filtering process for a data signal.

In FIG. 3, the modulator 10 is a Mach-Zehnder DQPSK optical modulator, and in this example, has LN modulators (inner modulators) 10a and 10b, and the phase shifter 11. The LN modulators 10a and 10b are, in this example, Mach-Zehnder interferometers. The LN modulator 10a is provided in one of a pair of optical paths (I arm and Q arm), and the LN modulator 10b is provided in another of the pair of optical paths. The phase shifter 11 gives the phase difference $\pi/2$ between the I arm and Q arm. The phase shifter 11 may be realized by a material whose optical path length (or refractive index) changes according to the voltage or temperature, for example. However, the phase of the phase shifter 11 is adjusted to $\pi/2-\Delta\phi$ when the power balance between the polarizations is adjusted.

A driver 12 drives the LN modulators 10a and 10b using drive signals Data I and Data Q. Here, drive signals Data I and Data Q are, for example, generated by encoding data X by a DQPSK encoder. In addition, the driver 12 has an amplifier and is capable of controlling the amplitude of the drive signals Data I and Data Q. The driver 12 illustrated in FIG. 3 is configured to output a differential signal, however, the driver 12 may provide single output.

Figure 4:
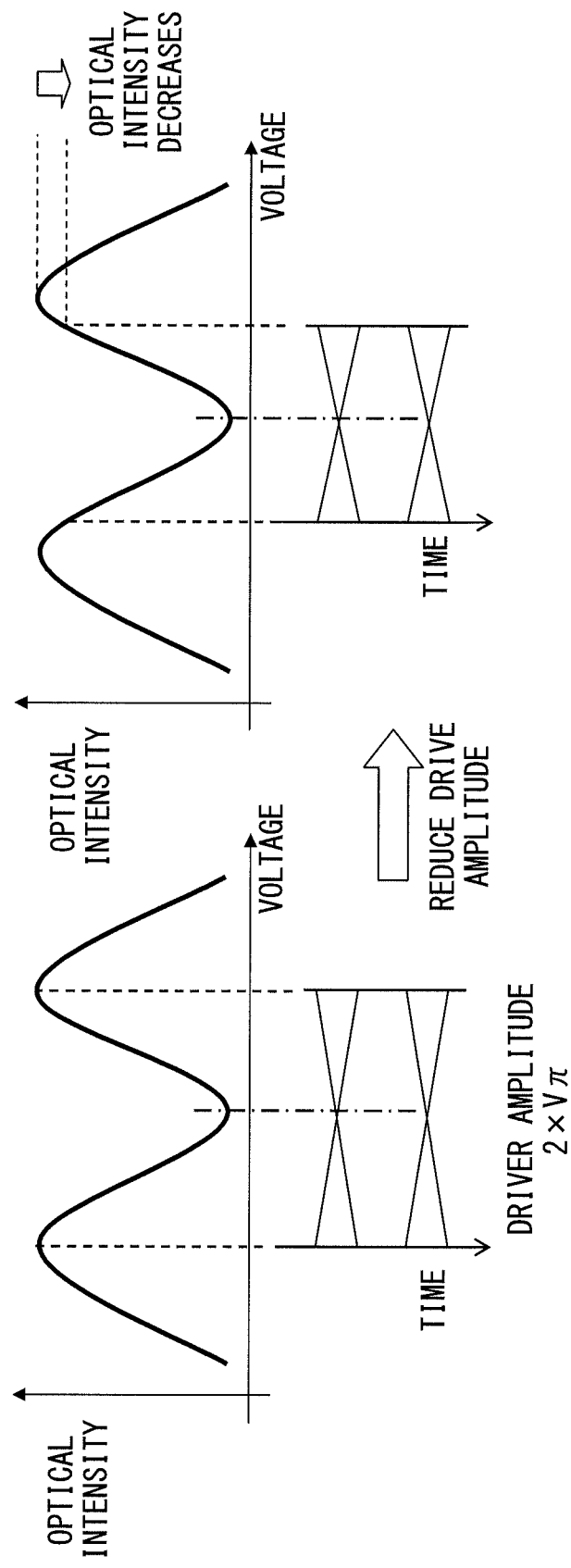
FIG. 4 is a diagram illustrating the operation of an LN modulator.

FIG. 4 is a diagram illustrating the operation of the LN modulator. The power of the output light of the LN modulator changes periodically with respect to the drive voltage. Here, the drive amplitude is "$2V\pi$", where "$V\pi$" is a half-wavelength voltage, which is a voltage for the power of the output light of the LN modulator to change from a local minimum to the local maximum. Therefore, in FIG. 3, when the amplitude of the drive signal Data I is reduced, the amplitude of the output optical signal of the LN modulator 10a becomes small, and the average power of the output light of the LN modulator 10a decreases. Similarly, when the amplitude of the drive signal Data Q is reduced, the average power of the output light of the LN modulator 10b decreases. The amplitude of the drive signals Data I and Data Q is controlled by the adjustment of the gain of the amplifier provide in the driver 12. If an amplifier with fixed gain is used, a similar effect may be obtained by adjusting the input signal amplitude of the amplifier. The powers of the output lights of the LN modulators 10a and 10b are controlled to be the same as each other.

Meanwhile, when the operating point of the modulator is shifted by adjusting the DC bias voltage applied to the LN modulators 10a and 10b, the average powers of the output lights of the LN modulators 10a and 10b change. In other words, for example in FIG. 4, when the DC voltage of the drive signal is adjusted, the corresponding output light signal changes, and the average power of the output light changes. Therefore, the power of the output light may be controlled by adjusting the DC bias voltage applied to the LN modulators 10a and 10b.

The configuration and operation of the modulator 20 is basically the same as those of the modulator 10. The modulator 20 has LN modulators 20a and 20b, and the phase shifter 21. The phase shifter 21 gives the phase difference $\pi/2$ between the I arm and Q arm in the same manner as the phase shifter 11. However, the phase of the phase shifter 21 is adjusted to $\pi/2+\Delta\phi$ when the power balance between the polarizations is adjusted.

The optical signal transmitter configured as described above transmits a pair of data X and Y using a polarization multiplexed optical signal. The modulator 10 is driven according to the data X, and a modulated optical signal X is generated. In the same manner, the modulator 20 is driven according to the data Y, and a modulated optical signal Y is generated. The modulated optical signals X and Y are guided to the polarization beam combiner 31. Then, the polarization beam combiner 31 generates a polarization multiplexed optical signal by polarization multiplexing of the modulated optical signals X and Y. The polarization multiplexed optical signal is transmitted through an optical fiber transmission path.

The optical signal transmitter illustrated in FIG. 3 has the control system (the photo detector 51, the AC component extracting device 52, the low pass filter 53, the AC component power detector 54, the controller 55) described with reference to FIG. 2. The photo detector 51 is, for example a photo diode, which converts the polarization multiplexed optical signal split by an optical splitter into an electric signal.

The low pass filter 53 removes the symbol frequency component of the data X and Y from the electric signal. For example, when the symbol frequency of the data X and Y is 20 Gsymbol/s, the low pass filter 53 removes at least the 20 GHz component. The AC component extracting device 52 removes the DC component from the electric signal, and extracts the AC component. The AC component extracting device 52 is realized, for example, by a capacitor that removes the DC component. Note that there is no particular limitation for the order in which the low pass filter 53 and the AC component extracting device 52. The AC component extracting device 52 may be provided on the input side of the low pass filter 53, or the AC component extracting device 52 may be provided on the output side of the low pass filter 53.

The AC component power detector 54 detects the power of the electric signal obtained as described above, and outputs the detection result as a monitor signal. Therefore, the monitor signal represents the AC component power of the electric signal that corresponds to the polarization multiplexed optical signal. The AC component power detector 54 may be realized by an analog circuit, or by a processor that performs digital operations. When the AC component power detector 54 is realized by a processor, the electric signal may be converted into digital data by an A/D converter not illustrated in the drawing and input to the AC component power detector 54.

The controller 55 generates one or more of control signals C1-C3 for minimizing the monitor signal. The control signal C1 is given to the drivers 12 and/or 22. That is, the amplitude of the drive signal that drives the modulator 10 and/or the amplitude of the drive signal that drives the modulator 20 is controlled by the control signal C1. The control signal C2 is given to the bias circuit that controls the bias of the modulators 10 and/or 20. That is, the bias point of the modulator 10 and/or the bias point of the modulator 20 is controlled by the control signal C2. The control signal C3 is given to the optical attenuators 13 and/or 23. That is, the attenuation amount of the optical attenuator 13 and/or the attenuation amount of the optical attenuator 23 is controlled by the control signal C3.

In the optical signal transmitter according to the first embodiment, feedback control is performed using one or more of the control signals C1-C3 described above. In other words, in the first embodiment, the power difference between the X polarization and the Y polarization is controlled by controlling one or more of the amplitude of the drive voltage, the bias of the modulator, and the attenuation amount of the optical attenuator.

In the optical signal transmitter configured as described above, when the power balance of the X polarization and the Y polarization is adjusted, the following state is set as described with reference to FIG. 2.

(1) Control data X and Y having the same data pattern as each other are given as data X and Y. It is preferable that the data X and Y are input to the modulators 10 and 20 in synchronization with each other and at the same timing. However, the input timing of the data X and Y may contain an error that is shorter than one symbol time.

(2) The phases of the phase shifters 11 and 21 are set to "A−Δϕ" and "A+Δϕ", respectively. In this example, A=π/2 as the modulation scheme is DQPSK.

Figure 5:
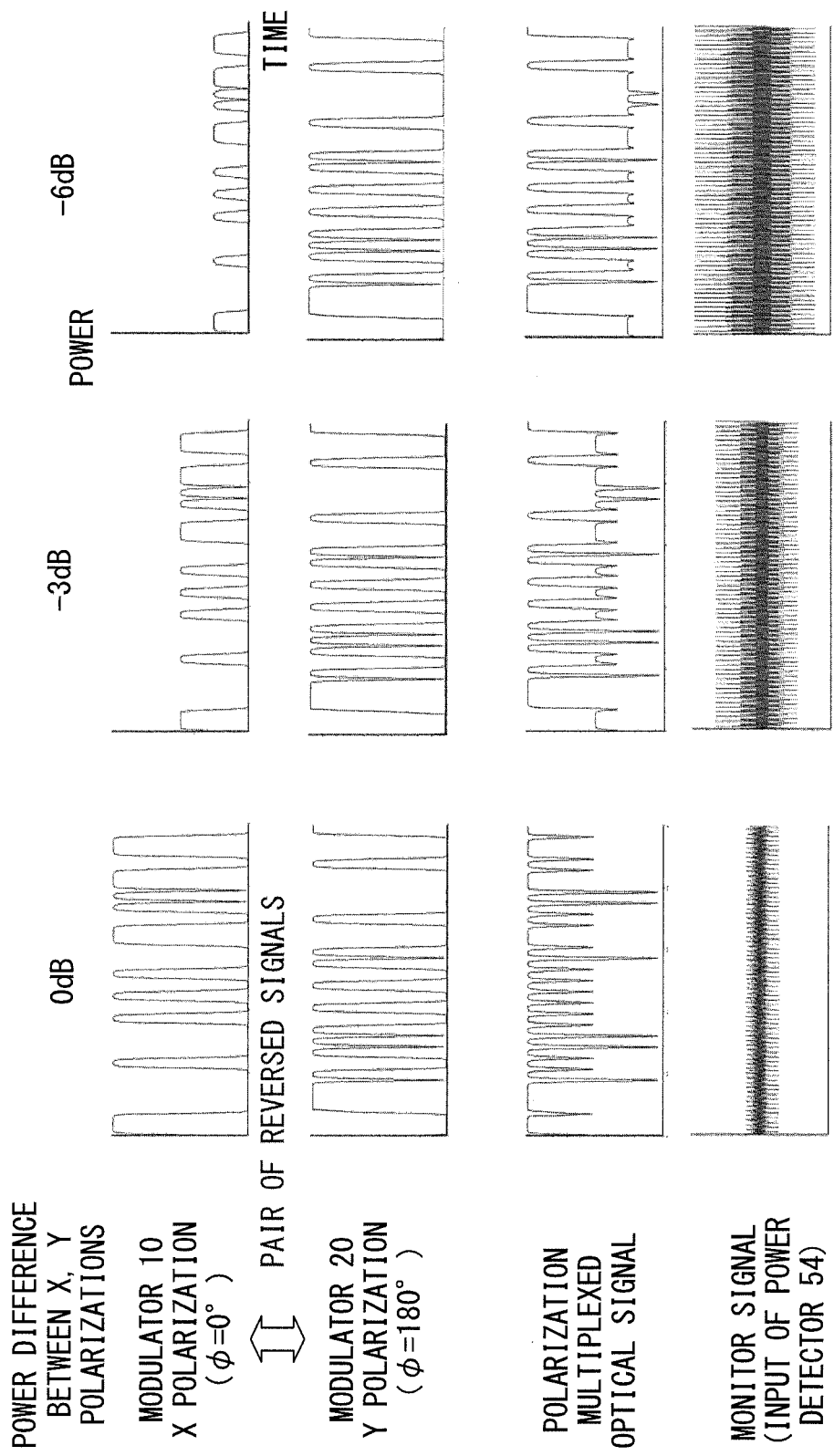
FIG. 5 is a simulation result (Δϕ=90 degrees) illustrating the relation between the power difference and the monitor signal in the first embodiment.

FIG. 5 is a simulation result that illustrates the power difference between the polarizations and the monitor signal. In this simulation, the cases where the power difference between the X polarization and the Y polarization is zero, 3 dB and 6 dB are compared. In addition, Δϕ=90 degrees. In other words, the phase difference ϕ between the LN modulators 10a and 10b is zero in the modulator 10, and the phase difference ϕ between the LN modulators 20a and 20b is 180 degrees in the modulator 20. Meanwhile, "X POLARIZATION", "Y POLARIZATION" and "POLARIZATION MULTIPLEXED OPTICAL SIGNAL" in FIG. 5 represent the optical power. In addition, "MONITOR SIGNAL" in FIG. 5 represents the input signal of the AC component power detector 54.

The control data X and Y given to the modulator 10 and 20 have, as described above, the same data pattern as each other. For this reason, when the phase difference ϕ in the modulator 10 is zero and the phase difference ϕ in the modulator 20 is 180 degrees, the data pattern of the modulated optical signal X (hereinafter, X polarization data) output from the modulator 10 and the data pattern of the modulated optical signal Y (hereinafter, Y polarization data) output from the modulator 20 are in the opposite phases from each other. When the X polarization data is "1 (light emitting status)", the Y polarization data is "0 (no light emission status)". When the X polarization data is "0", the Y polarization data is "1".

Accordingly, when the power difference between the X polarization and the Y polarization is small, the optical levels of the respective symbols in the polarization multiplexed optical signal output from the polarization beam combiner 31 become approximately the same. That is, the power variation (that is, the AC component power) of the polarization multiplexed optical signal becomes small. In contrast, when the power difference between the X polarization and the Y polarization becomes large, an optical power difference is generated between the symbols in the polarization multiplexed optical signal. That is, the power variation of the polarization multiplexed optical signal also becomes large. Thus, when the power difference between the X polarization and the Y polarization is small, the monitor signal that represents the AC component power of the polarization multiplexed optical signal also becomes small, and when the power difference between them becomes large, the monitor signal also becomes large. Meanwhile, the monitor signal output from the AC component power detector 54 is the average value or the integration value of "MONITOR SIGNAL" in FIG. 5.

As described above, in the optical signal transmitter according to the embodiment, when the power difference between the X polarization and the Y polarization is small, the monitor signal also becomes small. Therefore, when the controller 55 minimizes the monitor signal by the feedback control, the power difference between the X polarization and the Y polarization is also minimized. In order to minimize the monitor signal, at least one of the drive voltage of the drivers 12 and/or 22, the bias of the modulators 10 and/or 20, and the attenuation amount of the optical attenuators 13 and/or 23 is controlled, as described above.

Figure 6:
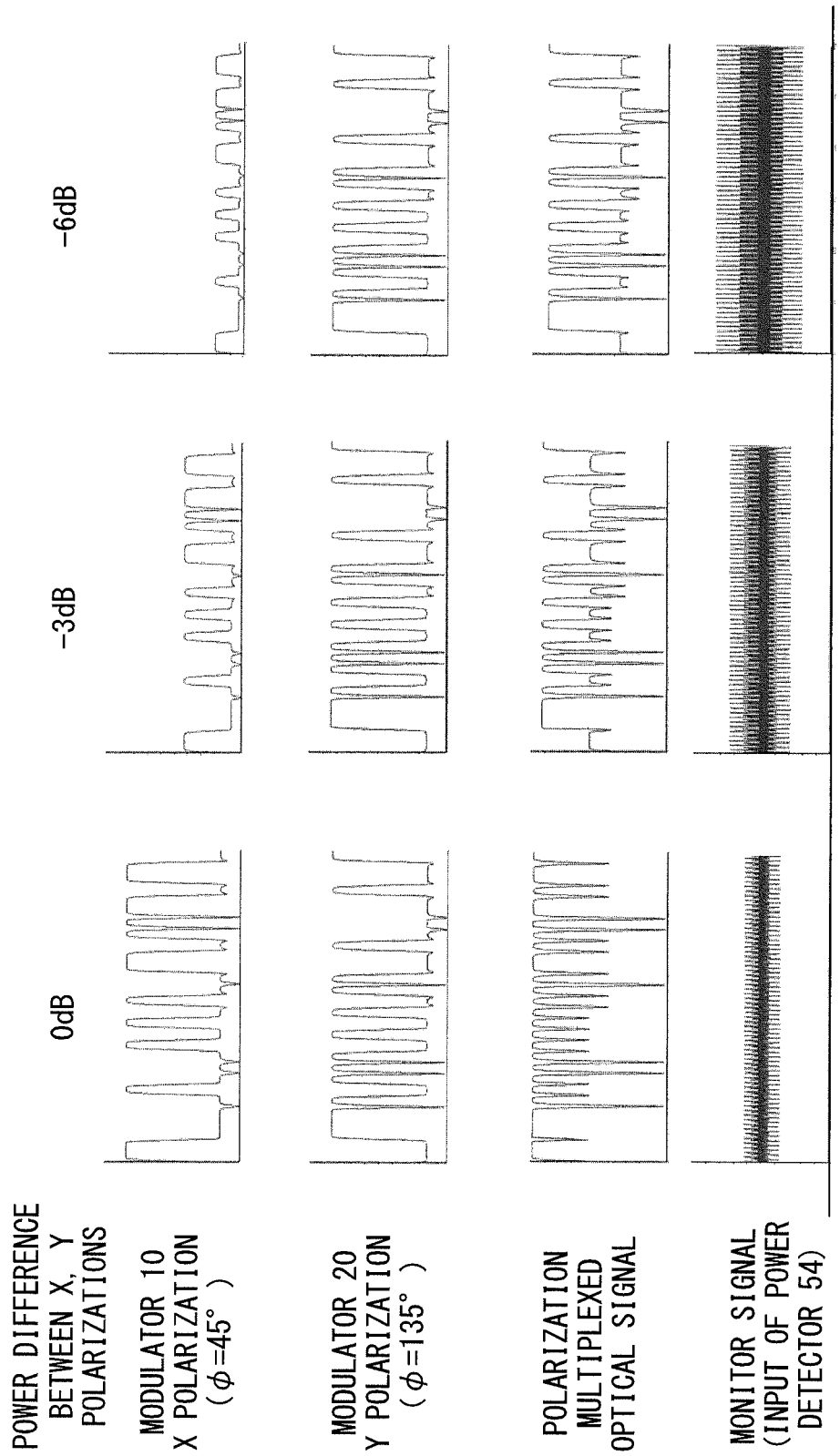
FIG. 6 is a simulation result (Δϕ=45 degrees) illustrating the relation between the power difference and the monitor signal in the first embodiment.

FIG. 6 is a simulation result in the case where Δϕ=45 degrees. The phase difference ϕ in the modulator 10 is 45 degrees, and the phase difference ϕ in the modulator 20 is 135 degrees.

In the case where the phase difference in the modulators 10 and 20 are set in this way, the monitor signal also becomes small when the power difference between the X polarization and the Y polarization is small. Therefore, there is no particular limitation on Δϕ as long as it is a value other than zero. However, the sensitivity of the monitor signal is the best when Δϕ=90 degrees in QPSK/DQPSK.

Figure 7:
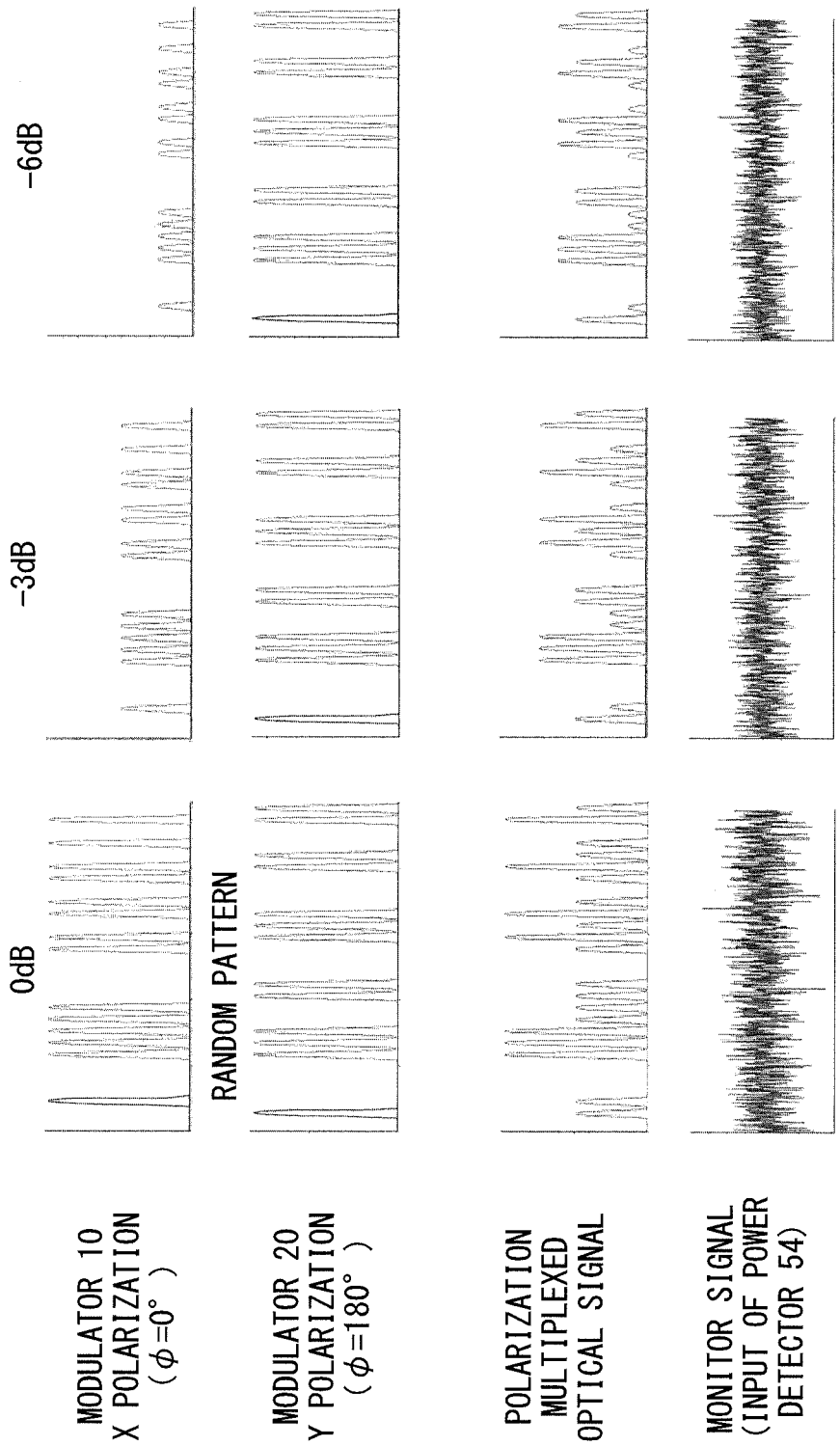
FIG. 7 is a simulation result (random data input) illustrating the relation between the power difference and the monitor signal in the first embodiment.

FIG. 7 is a simulation result when the data X and Y are not the same as each other (that is, a random pattern), where Δϕ=90. In this case, even when the power difference between the X polarization and the Y polarization is zero, the power variation of the polarization multiplexed optical signal is large. That is, the AC component power of the monitor signal is hardly dependent on the power difference between the X polarization and the Y polarization. Therefore, when the data X and Y are different from each other, it is difficult to control the power difference between the X polarization and the Y polarization using the AC component power of the polarization multiplexed optical signal.

Here, the control of the phases of the phase shifters 11 and 21 to "A−Δϕ" and "A+Δϕ" respectively and the same control data being given to the modulators 10 and 20 are described. In the following description, it is assumed that the modulation scheme is DQPSK, and A=π/2. It is also assumed that when the power balance is adjusted, Δϕ=90. In other words, when the power balance is adjusted, the phase ϕ of the phase shifter 11 of the modulator 10 is zero, and the phase ϕ of the phase shifter 21 of the modulator 20 is 180 degrees. Furthermore, it is assumed that the optical devices in the optical signal transmitter have ideal characteristics.

In DQPSK, 2-bit data are transmitted with every one symbol. Then, it is assumed that at the time of data transmission (that is, ϕ=π/2), each symbol is transmitted in the following state.
symbol (1,1): the phase of the carrier=π/4, optical power=√2
symbol (0,1): the phase of the carrier=3π/4, optical power=√2
symbol (0,0): the phase of the carrier=5π/4, optical power=√2
symbol (1,0): the phase of the carrier=7π/4, optical power=√2

In this case, while the power balance is being adjusted, the state of the modulated optical signal X obtained by the modulator 10 (ϕ=0) becomes as follows.
symbol (1,1): the phase of the carrier=0, optical power=2
symbol (0,1): optical power=0
symbol (0,0): the phase of the carrier=π, optical power=2
symbol (1,0): optical power=0

At this time, the state of the modulated optical signal Y obtained by the modulator 20 (ϕ=180) becomes as follows.
symbol (1,1): optical power=0
symbol (0,1): the phase of the carrier=0, optical power=2
symbol (0,0): optical power=0
symbol (1,0): the phase of the carrier=π, optical power=2

Here, in order to make the explanation simple, it is assumed that the power of the polarization multiplexed optical signal is the sum of the optical powers of the modulated optical signals X and Y. In addition, while the power balance is being adjusted, the same control data are given to the modulators 10 and 20. Then, the power of the polarization multiplexed optical signal becomes as follows.
symbol (1,1): optical power=2 (=2+0)
symbol (0,1): optical power=2 (=0+2)
symbol (0,0): optical power=2 (=2+0)
symbol (1,0): optical power=2 (=0+2)

Thus, in the optical signal transmitter according to the embodiment, when the phases of the phase shifters 11 and 21 are controlled to "A−Δϕ" and "A+Δϕ" respectively and the same control data are given to the modulators 10 and 20, the variation of the power of the polarization multiplexed optical signal is small (ideally zero). That is, the AC component power of the polarization multiplexed optical signal becomes small.

At this time, it is assumed that, for example, the power of the modulated optical signal Y obtained by the modulator 20 ($\phi$=180) decreases by 3 dB. In this case, the state of the modulated optical signal Y becomes as follows.

symbol (1,1): optical power=0
symbol (0,1): the phase of the carrier=0, optical power=1
symbol (0,0): optical power=0
symbol (1,0): the phase of the carrier=$\pi$, optical power=1

Then, the power of the polarization multiplexed optical signal becomes as follows.

symbol (1,1): optical power=2 (=2+0)
symbol (0,1): optical power=1 (=0+1)
symbol (0,0): optical power=2 (=2+0)
symbol (1,0): optical power=1 (=0+1)

Thus, the power difference between the optical modulation X and Y (that is, the power difference between the X polarization and the Y polarization) occurs, the variation of the power of the polarization multiplexed optical signal becomes large. Therefore, the optical signal transmitter according to the embodiment controls at least one of the modulators 10 and 20 so as to minimize the monitor signal that represents the AC component power of the polarization multiplexed optical signal. Accordingly, the power difference between the polarizations is minimized.

Meanwhile, in the optical signal transmitter according to the embodiment, since feedback control is performed using the optical signal after polarization multiplexing, the optical power difference between the polarizations generated between the light source 1 and the polarization beam combiner 31 is controlled. Therefore, the power difference (control error) between the polarizations of several dB that could occur due to the characteristics of the photo detector provided in the respective modulators 10 and 20 or the characteristics of the polarization beam combiner 31 is compensated for. In addition, the circuit elements from the photo detector 51 to the AC component power detector 54 may be shared with a part of the circuit that controls the bias of the modulators 10 and 20, and/or a part of the circuit that controls the phase shifters 11 and 21. In this configuration, the size reduction or simplification of the optical signal transmitter is realized.

Figure 8:
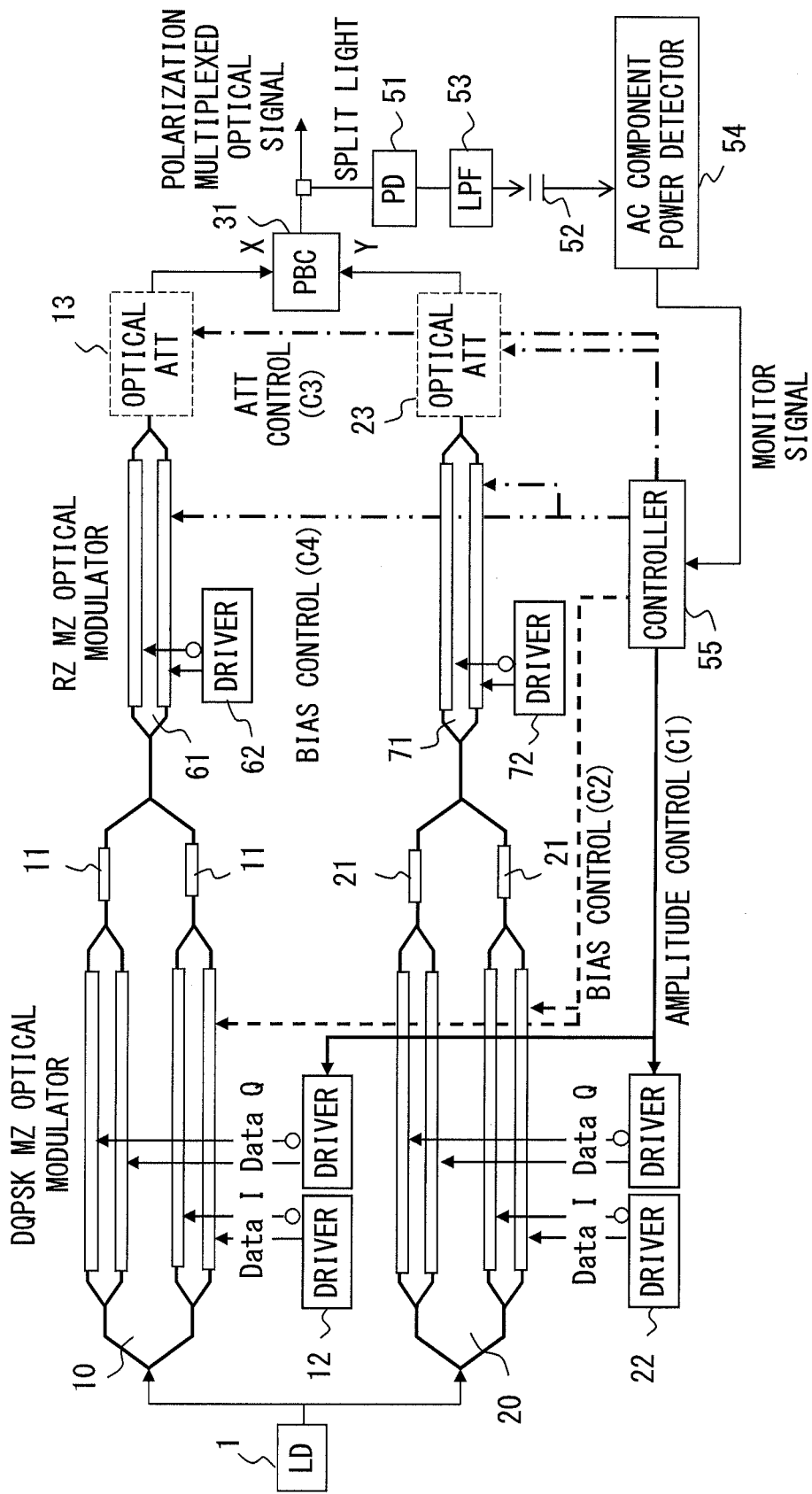
FIG. 8 is a diagram illustrating a second embodiment of the optical signal transmitter.

FIG. 8 is a diagram illustrating a second embodiment of the optical signal transmitter. The optical signal transmitter according to the second embodiment has an RZ optical modulator on the input side or output side of the DQPSK optical modulator. In the example illustrated in FIG. 8, RZ optical modulators 61 and 71 are provided on the output side of the modulators (DQPSK optical modulators) 10 and 20, respectively. Therefore, in the second embodiment, data are transmitted in RZ-DQPSK modulation scheme. Note that the modulators 10 and 20 operate as phase modulators, and the RZ optical modulators 61 and 71 operate as intensity modulators.

The RZ optical modulators 61 and 71 are, for example, Mach-Zehnder LN modulators, and perform RZ modulation according to a drive signal generated by driver circuits 62 and 72, respectively. Here, driver circuits 62 and 72 generate a drive signal synchronized with the symbol clock. The drive signal is, while there is no particular limitation, for example, a sine wave of the same frequency as the clock. The amplitude of the drive signal is, for example, V$\pi$.

The RZ optical modulators 61 and 71 has, in the same manner as the modulators 10 and 20, a bias circuit (ABC circuit) not illustrated in the drawing, in order to control the operating point of the LN modulator. The power of the output light may be controlled by adjusting the DC bias voltage applied to the RZ optical modulators 61 and 71.

The optical attenuators 13 and 23 may be omitted. In addition, the optical attenuators 13 and 23 may be provided on the input side of the modulators 10 and 20, or may be provided between the modulators 10 and 20 and the RZ optical modulators 61 and 71, respectively.

In the optical transmitter configured as described above, the configuration and the operation of the control system controlling the power difference between the polarizations is basically the same as those in the first embodiment. That is, the controller 55 generates a control signal for minimizing the monitor signal corresponding to the polarization multiplexed optical signal. However, the controller 55 in the second embodiment generates a control signal C4. The control signal C4 controls the bias of the RZ optical modulators 61 and 71. In other words, the control signal C4 adjusts the output optical power of the RZ optical modulator 61 and/or the output optical power of the RZ optical modulator 71. Therefore, the power difference between the X polarization and the Y polarization is optimized by feedback control using the control signal C4. Note that in the configuration of the second embodiment, the power difference may be controlled also using the control signals C1-C3.

Figure 9:
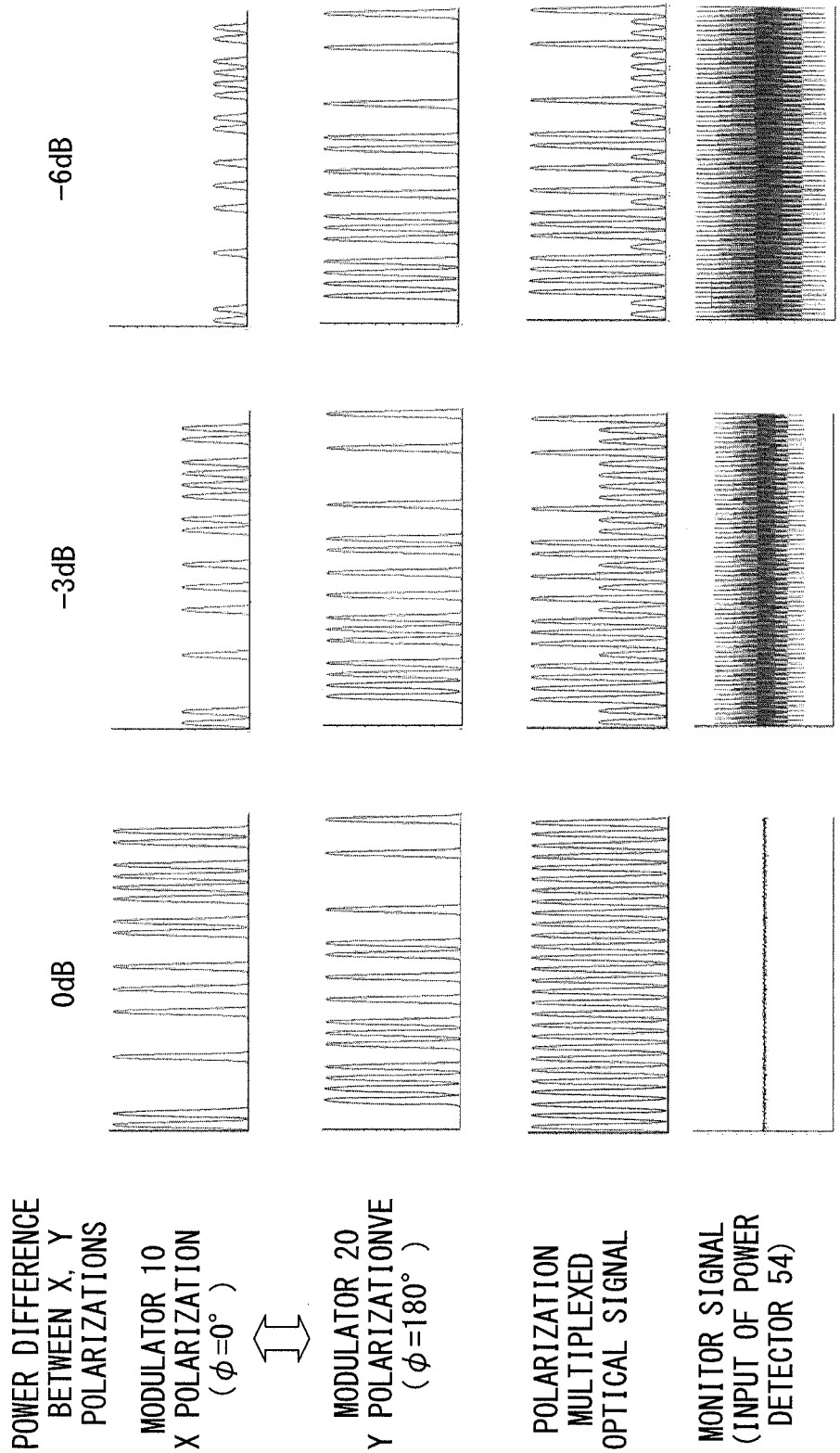
FIG. 9 is a simulation result (Δϕ=90 degrees) illustrating the relation between the power difference and the monitor signal in the second embodiment.
Figure 10:
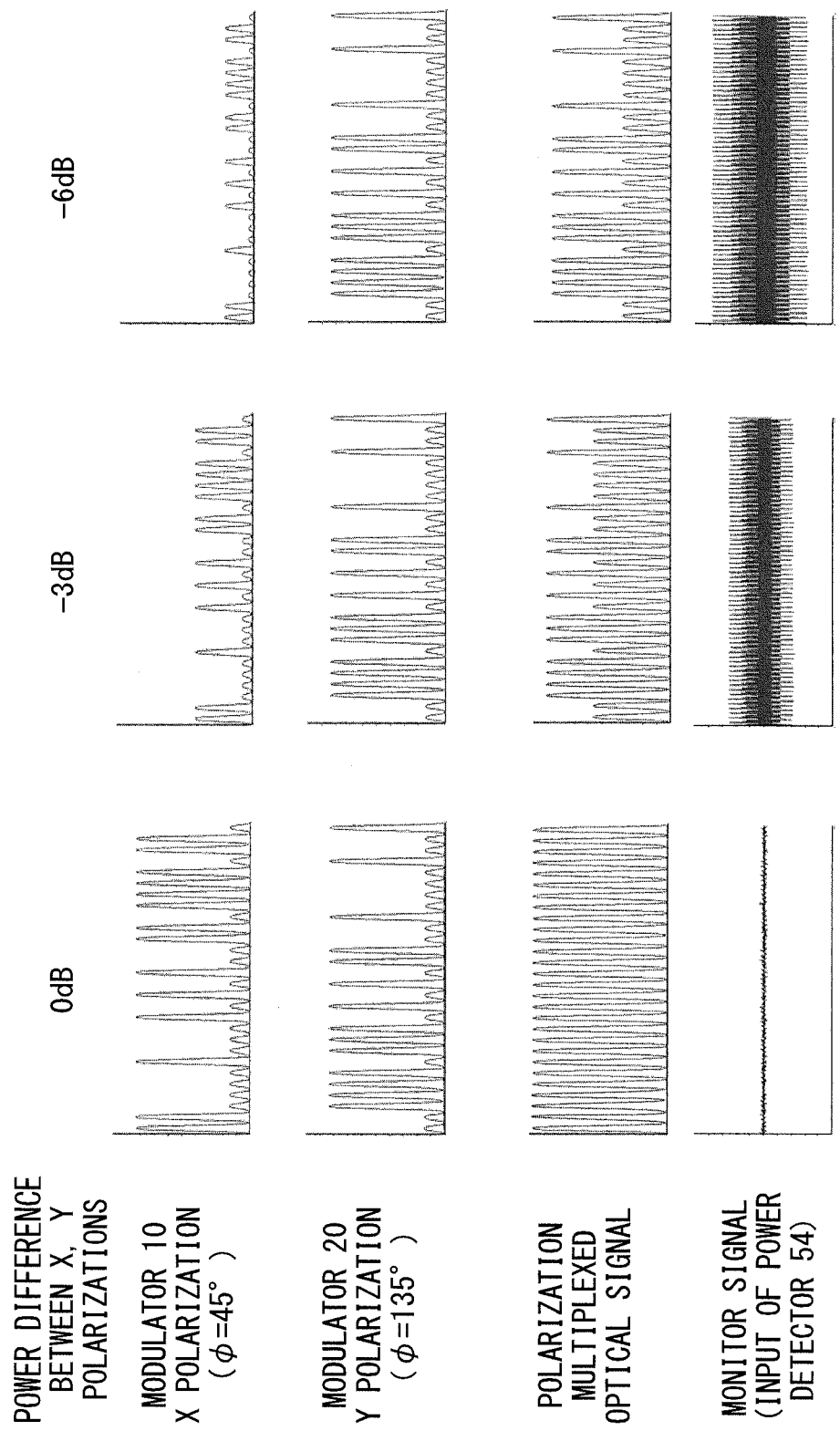
FIG. 10 is a simulation result (Δϕ=45 degrees) illustrating the relation between the power difference and the monitor signal in the second embodiment.

FIG. 9 and FIG. 10 are simulation results illustrating the relation between the power difference and the monitor signal in the second embodiment. FIG. 9 and FIG. 10 represent the simulation results in the cases where $\Delta\phi$=90 degrees and $\Delta\phi$=45 degrees, respectively.

In the second embodiment (RZ-DQPSK), similarly to the first embodiment (NRZ-DQPSK), when the power difference between the X polarization and the Y polarization becomes small, the monitor signal also becomes small. Therefore, the power difference between the X polarization and the Y polarization may be reduced when feedback control is performed so as to minimize the monitor signal. Note that there is no limitation on the value of $\Delta\phi$ ($\neq$0) also in the second embodiment. In addition, according to RZ-DQPSK, when the power difference between the X polarization and the Y polarization becomes zero, the monitor signal takes a value close to zero. Therefore, the sensitivity of the adjustment with respect to the monitor signal becomes higher in RZ-DQPSK.

Figure 11:
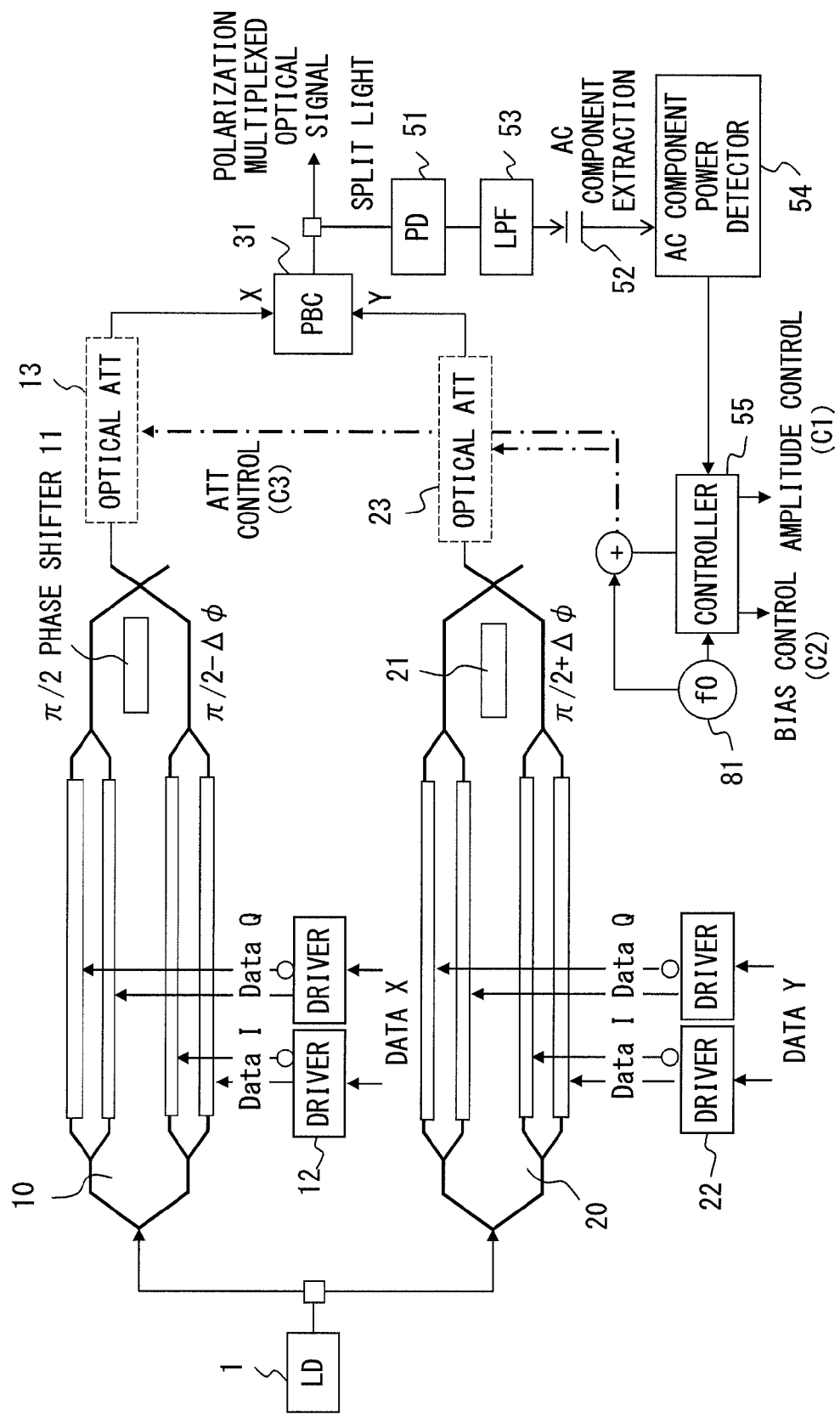
FIG. 11 is a diagram illustrating a third embodiment of the optical signal transmitter.

FIG. 11 is a diagram illustrating a third embodiment of the optical signal transmitter. The optical signal transmitter according to the third embodiment has the configuration to detect the minimum point of the AC component power using synchronized detection. FIG. 11 illustrates the configuration in which the attenuation amount of the optical attenuators 13 and 23 is controlled using the control signal C3.

A low-frequency signal generator 81 generates a low-frequency signal. The frequency of the low-frequency signal is sufficiently low with respect to the symbol frequency. The frequency of the low-frequency signal is, for example, several hundreds Hz-several MHz. A superimposer (adder) 82 superimposes (adds) the low-frequency signal on the control signal C3 generated by the controller 55. The control signal C3 on which the low-frequency signal has been superimposed is then given to the optical attenuators 13 and 23. Accordingly, the power of the modulated optical signals X and Y oscillates at the frequency of the low-frequency signal, and the power of the polarization multiplexed optical signal also oscillates at the frequency of the low-frequency signal. Therefore, the monitor signal output from the AC component power detection unit 54 also oscillates at the frequency of the low-frequency signal.

A low-frequency signal is given from the low-frequency signal generator 81 to the controller 55. The controller 55 uses the low-frequency signal to perform synchronized detection of the monitor signal. That is, the controller 55 detects the monitor signal by synchronized detection. The feedback control by the controller 55 for minimizing the detected monitor signal is the same as that in the first embodiment. Note that the synchronized detection may be applied to a configuration in which the control signals C1 and C2 are used, as well as to RZ-DQPSK illustrated in FIG. 8.

Figure 12:
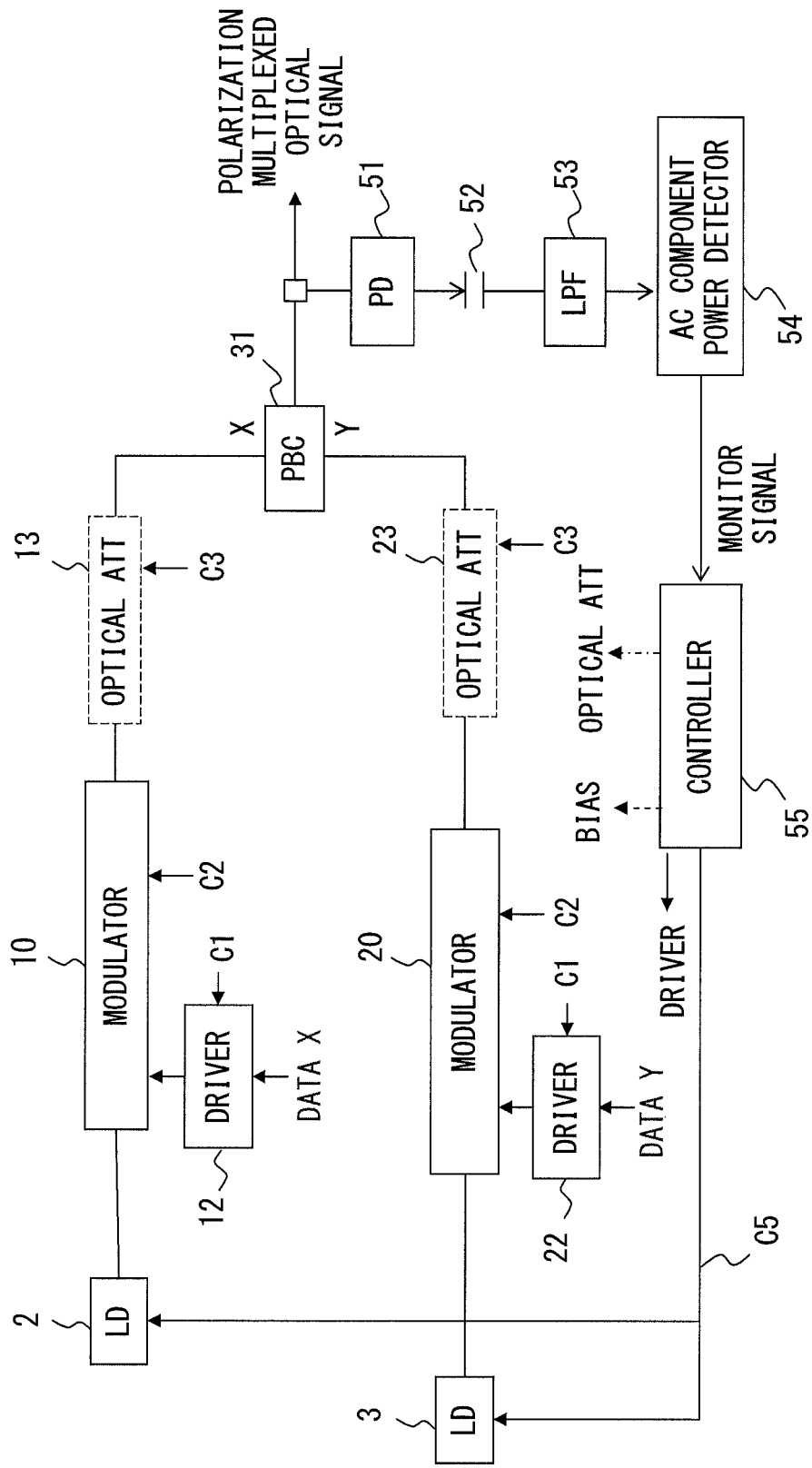
FIG. 12 is a diagram illustrating a fourth embodiment of the optical signal transmitter.

FIG. 12 is a diagram illustrating a fourth embodiment of the optical signal transmitter. In the optical signal transmitter in the fourth embodiment, light sources 2 and 3 are provided for the modulators 10 and 20, respectively. The modulator 10 generates the modulated optical signal X using the output of the light source 2, and the modulator 20 generates the modulated optical signal Y using the output of the light source 3.

In the optical signal transmitter configured as described above, the controller 55 generates a control signal C5. The control signal C5 is given to the light sources 2 and/or 3. The light sources 2 and 3 controls the output optical power according to the control signal C5. At this time, the controller 55 generates the control signal C5 while performing feedback control so as to minimize the monitor signal. Accordingly, the optical powers of the X polarization and the Y polarization of the polarization multiplexed optical signal may become approximately the same as each other. Here, the optical signal transmitter of the fourth embodiment may generate the control signals C1-C3. Thus, in the fourth embodiment, the power difference between the polarizations is controlled by controlling one or more of the amplitude of the drive voltage, bias of the modulator, the attenuation amount of the optical attenuator and the output optical power of the light source.

Meanwhile, in the first-fourth embodiments, the control data X and Y having the same data pattern as each other are input to the modulators 10 and 20 when the power balance between the X polarization and the Y polarization is adjusted. However, the control data X and Y does not need to be the same as each other. For example, the data pattern of the control data X may be the reversed phase data of the control data Y. In this case, the control data Y may be generated by reversing each symbol of the control data X.

Figure 13:
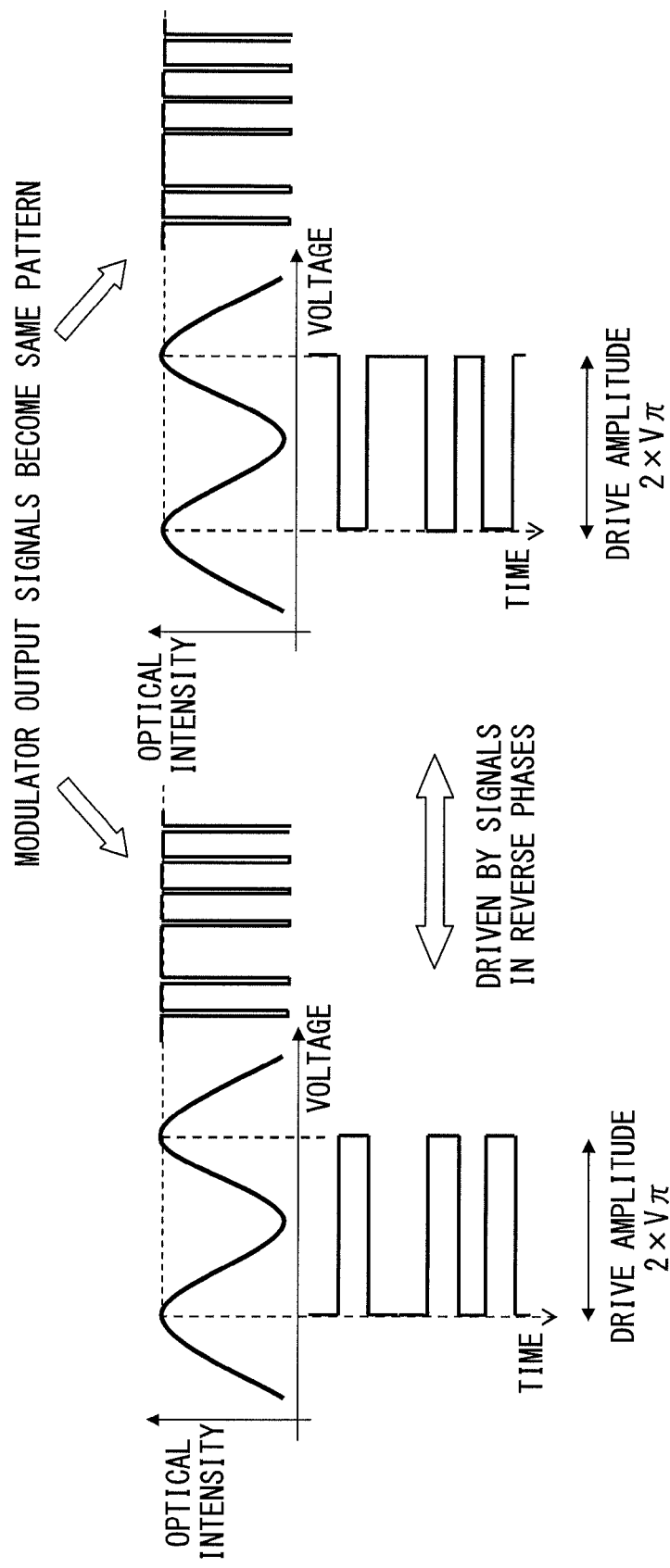
FIG. 13 is a diagram illustrating the input and output of the LN modulator in the case where a pair of drive data are in reverse phase with each other.

FIG. 13 illustrates the input and output of the LN modulator in the case where the drive data are in reverse phase with each other. Here, the amplitude of the drive voltage of the LN modulator is supposed to be $2V\pi$. That is, the amplitude of the drive voltage of the modulators 10 and 20 that operate as DQPSK modulators is $2V\pi$. FIG. 13 illustrates the input and output of one of the arms (I arm or Q arm) of the DQPSK modulator.

In the LN modulators driven at $2V\pi$, in the case where the drive signals are in reserve phases as each other, the data patterns of the modulated optical signals output from the modulators become the same as each other. In other words, in the modulators 10 and 20, when the control data X and Y are the same patterns as each other, and when the control data X and Y are in reverse phases as each other, the same modulated optical signals may be obtained.

Figure 16:
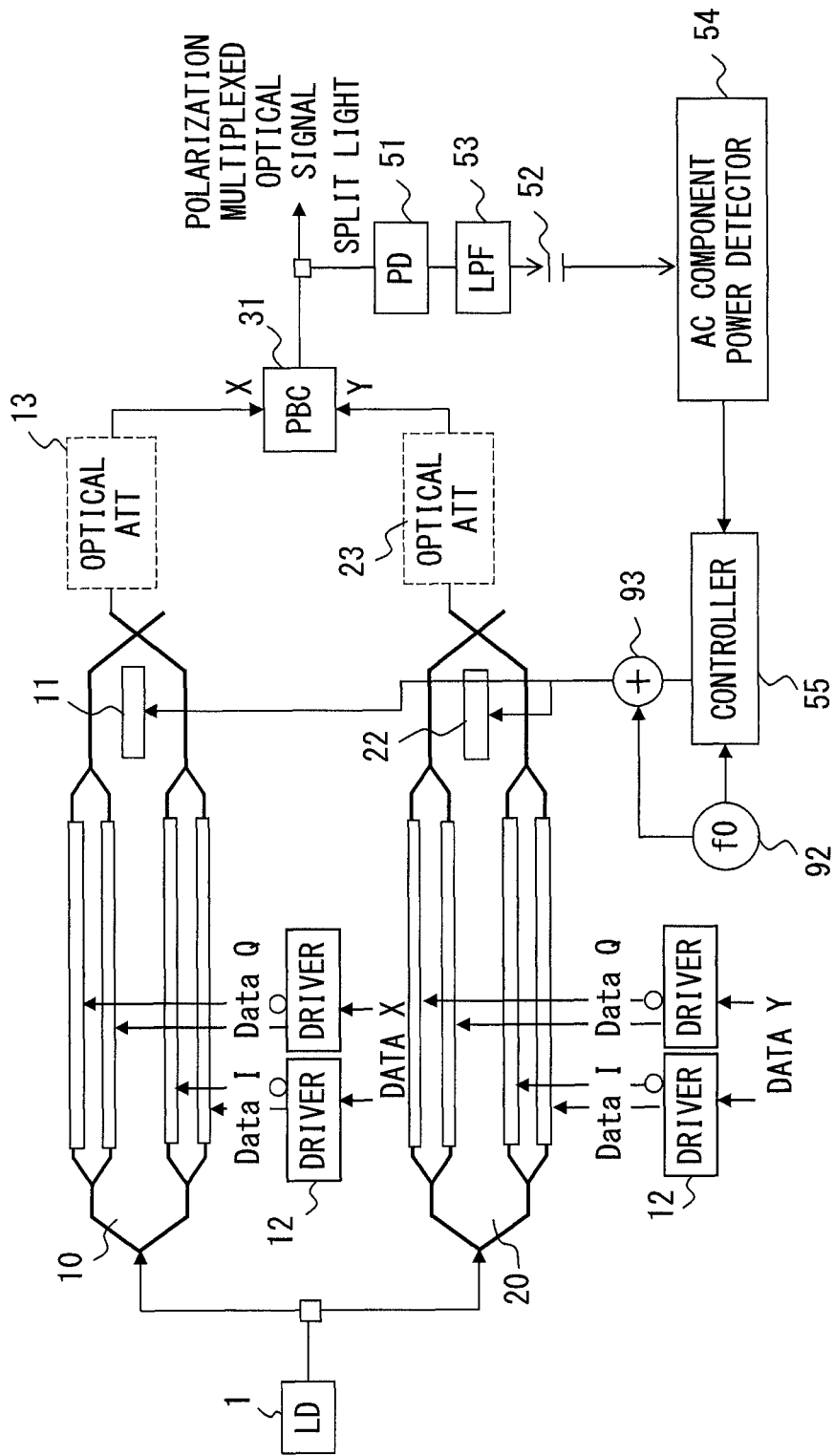

Meanwhile, in the optical signal transmitter according to the first-fourth embodiments, when the power balance between the X polarization and the Y polarization is adjusted, the phases of the phase shifters 11 and 21 are set to "A−Δϕ" and "A+Δϕ", respectively. Hereinafter, the control method of the phase shifters 11 and 21 is described with reference to FIG. 14-FIG. 16. In FIG. 14-FIG. 16, for making the drawings easier to view, the control system for controlling the power balance is omitted.

For example, while there is no limitation, the phase shifter 11 and 21 apply a voltage to one or both of a pair of optical paths provided in each modulator and adjust the phase difference between the optical paths by controlling the optical path length of the optical path. In examples illustrated in FIG. 14-FIG. 16, the phase difference is adjusted according to the voltage of a phase shift control signal given from the controller.

Meanwhile, in the modulators 10 and 20 being DQPSK optical modulators, the AC component of the output optical power becomes local minimum when the phase difference between a pair of optical paths is zero, $\pi/2$, $\pi$, or $3\pi/2$. In other words, in the modulators 10 and 20, by controlling the voltage to be applied to the phase shifters 11 and 21 so as to make the AC component of the output optical power local minimum, the phase difference between the pair of optical paths converges at zero, $\pi/2$, $\pi$, or $3\pi/2$. Here, it is assumed that the phase shift control voltage (Vs) to set the phase difference between the pair of optical paths approximately $\pi/2$ is obtained in advance based on the design of the optical waveguide providing the optical paths of the phase modulators 10 and 20.

In this case, when the phase shift control voltage is Vs, the AC component of output optical power is local minimum. When the local minimum point of the AC component of the output optical power is detected while the phase shift control voltage is gradually increased from Vs, the phase difference between the pair of optical paths is either zero or $\pi$. When the local minimum point of the AC component of the output optical power is detected while the phase shift control voltage is gradually decreased from Vs, the phase difference between the pair of optical paths is the other of zero and $\pi$.

In the optical signal transmitter according to the embodiment, for example, the local minimum point described above is detected by the dithering method. In the configuration illustrated in FIG. 14, a controller 91 generates a phase shift control signal. The phase shifter control signal is, for example, a DC voltage. A low-frequency signal generator 92 generates a low-frequency signal. The frequency (f0) of the low-frequency signal is sufficiently low with respect to the symbol rate of the data X and Y. A superimposer (adder) 93 superimposes (adds) the low-frequency signal on the phase shift control signal. Therefore, the phase shift control signal on which the low-frequency signal has been superimposed is given to the phase shifters 11 and 21. Thus, the phase provided by the phase shifters 11 and 21 varies with the frequency of the low-frequency signal. As a result, the AC component of the output optical power of the modulators 10 and 20 also varies with the frequency of the low-frequency signal.

Photo detectors (PD) 94X and 94Y respectively convert the output light from the modulators 10 and 20. The photo detectors 94X and 94Y may be provided within the modulators 10 and 20, or may be provided outside the modulators 10 and 20. A switch (selector) 95 selects an electric signal obtained by the photo detectors 94X or 94Y according to the instruction from the controller 91. A low pass filter 96 removes the high-frequency component (for example, the symbol frequency) of the electric signal selected by the switch 95. An AC component extracting device 97 removes the DC component of the electric signal. An AC component power detector 98 detects the AC component power of the filtered electric signal. At this time, the output signal of the AC component power detector 98 includes the f0 component.

The controller 91 generates the phase shift control signal using the f0 component contained in the output signal of the AC component power detector 98 so that the AC component power becomes local minimum. At this time, when controlling the phase shifter 11 of the modulator 10, the switch 95 selects the electric signal of the photo detector 94X. Then, the controller 91 gives the generated phase shift control signal to the phase shifter 11. When controlling the phase shifter 21 of the modulator 20, the switch 95 selects the electric signal of the photo detector 94Y. Then, the controller 91 gives the generated phase shift control signal to the phase shifter 21.

In the configuration illustrated in FIG. 14, the low pass filter 96, the AC component extracting device 97, and the AC component power detector 98 are shared for X polarization and Y polarization to control the phase shifters 11 and 21. In contrast, in the configuration illustrated in FIG. 15, a low pass filter 96X, an AC component extracting device 97X and an AC component power detector 98X are provided to control the phase shifter 11, and a low pass filter 96Y, an AC component extracting device 97Y and an AC component power detector 98Y are provided to control the phase shifter 21. Meanwhile, in the configuration illustrated in FIG. 14 and FIG. 15, the control procedures are basically the same as those of each other.

The controller 91 illustrated in FIG. 14 and FIG. 15 may be realized as a part of the functions of the controller 55 in the first-fourth embodiments. In addition, the photo detectors provided for another purpose (for example, the bias control of the modulators 10 and 20) may be used as the photo detectors 94X and 94Y illustrated in FIG. 14 and FIG. 15.

In the configuration illustrated in FIG. 16, feedback control of the phase shifter 11 and 21 is performed using a polarization multiplexed optical signal. In this configuration, the controller 55 generates the phase shift control signal. That is, the controller 55 may be equipped with both the function of controlling the phase shifters 11 and 21, and the function of controlling the power balance between the polarizations.

Next, the method of controlling the power balance between the X polarization and the Y polarization repeatedly or continuously during the period in which the optical signal transmitter is transmitting data.

In the embodiments described above, the power balance between the X polarization and the Y polarization is adjusted during the period in which the optical signal transmitter is not transmitting data. The optical signal transmitter starts the transmission of data after the power balance between the X polarization and the Y polarization is adjusted. However, the power balance between the X polarization and the Y polarization changes due to the temperature, aging and so on. Therefore, in the configuration described below, the power balance between the X polarization and the Y polarization is controlled regularly or continuously during data transmission, using the control result obtained in the method in the embodiments described above. In the following description, the control performed during the period in which the optical signal transmitter is not transmitting data to a receiving station may be called "offline control", and the control performed during the period in which the optical signal transmitter is transmitting data to a receiving station is called "online control"

FIG. 17 is a diagram illustrating the configuration of the optical signal transmitter that performs the online control. In this example, the configuration of the optical signal transmitter illustrated in FIG. 17 is based on the first embodiment illustrated in FIG. 3. That is, the optical signal transmitter has the photo detector 51, the AC component extracting device 52, the low pass filter 53, the AC component power detector 54, and a controller 101. The controller 101 has the control function provided by the controller 55 in the first embodiment. The optical signal transmitter that performs the online control may be based on the configuration of the second-fourth embodiments.

The optical signal transmitter is capable of controlling the power balance between the X polarization and the Y polarization based on the optical power of the modulated optical signals X and Y output from the modulators 10 and 20. That is, a photo detector 111, which is a photo diode for example, converts the modulated optical signal X generated by the modulator 10 into an electric signal. Here, it is assumed that the modulator 10 outputs a pair of optical signals that are mutually complementary. In this case, one of the pair of optical signals may be guided to the polarization beam combiner 31, and the other optical signals may be guided to the photo detector 111. Meanwhile, the photo detector 111 may be provided within the modulator 10. In addition, leaking light from a coupler at the output side of the modulator 10 may be guided to the photo detector 111. Then, the DC component of the output signal of the photo detector 111 is given to the controller 101. The AC component of the output signal of the photo detector 111 is given to a modulator controller 112. The modulator controller 112 controls, for example, the bias of the modulator 10. In this case, the modulator controller 112 operates as an ABC (Auto Bias Control) circuit.

A photo detector 121 converts the modulated optical signal Y generated by the modulator 20 into an electric signal. Then, the DC component of the output signal of the photo detector 121 is given to the controller 101. The AC component of the output signal of the photo detector 121 is given to the modulator controller 122.

As described above, the output signals of the photo detectors 111 and 121 are given to the controller 101. Here, the output signals of the photo detectors 111 and 122 correspond to the average output optical powers of the modulators 10 and 20, respectively. Therefore, the difference between the output signals of the photo detectors 111 and 121 may be a parameter indicating the power difference between the X polarization and the Y polarization. That is, by performing control to make the difference between the output signals of the photo detectors 111 and 121 zero, the power difference between the X polarization and the Y polarization becomes small.

However, according to this method, the factor generated on the output side of the adjusting point of the optical power (for example the modulators 10 and 20, the optical attenuators 13 and 23) cannot be compensated for. For example, when the characteristics of the photo detectors 111 and 121 are different from each other, even if the difference between the output signals of the photo detectors 111 and 121 is controlled to be zero, the power difference between the X polarization and the Y polarization contained in a polarization multiplexed optical signal does not become zero. In addition, the variation in the combining characteristics of the polarization beam combiner 31 may also cause a similar problem.

In order to solve this problem, the optical signal transmitter illustrated in FIG. 17 has a first control system (a control system that uses the polarization multiplexed optical signal) and a second control system (a control system that uses the modulated optical signals X and Y). Then, the controller 101 performs the processes in the flowchart in FIG. 18.

Steps S1-S5 are offline control performed during the period in which the optical signal transmitter is not transmitting data. In step S1, the power balance between the X polarization and the Y polarization is controlled using the first control system. In step S1, as described with reference to FIG. 2 and FIG. 3, the power balance is controlled by the following procedures.

(1) The phases of the phase shifters 11 and 21 are set to "A$-\Delta\phi$" and "A$+\Delta\phi$", respectively. In DQPSK, A=$\pi/2$, and $\Delta\phi$ is, for example, 90 degrees.

(2) The control data X and Y having the same data pattern as each other are given to the modulators 10 and 20.

(3) One or more of the control signals C1-C3 are generated so as to minimize the monitor signal obtained by the AC component power detector 54.

In step S2, the control result (init_adj_1) in S1 is stored in a specified memory area. The control result to be stored is the setting value of power adjustment elements. The power adjustment elements are, in this example, the bias of the modulators 10 and 20, the amplitude of drive signal output from the drivers 12 and 22, and the attenuation amount of the optical attenuators 13 and 23. In addition, when the light sources 2 and 3 are provided for the modulators 10 and 20 respectively, the output optical power of the light sources 2 and 3 is also one of the power adjustment elements. Then, for example, when the power of the X polarization and/or the Y polarization is adjusted by controlling the attenuation amount of the optical attenuators 13 and 23, information representing the control voltage for controlling the attenuation amount of the optical attenuator is stored.

In step S3, the power balance between the X polarization and the Y polarization is controlled using the second control system. In step S3, as described above, one or more of the control signals C1-C3 is generated so that the difference between the electric signals obtained from the photo detectors 111 and 121 (that is, the powers of the modulated optical signal X and Y) becomes zero. At this time, the phases of the phase shifters may be "A−Δϕ" and "A+Δϕ", respectively, or may be the optimal phase (that is, A) respectively. The data X and Y may be the same as each other or may be different from each other. However, in order to measure the error between the first control system and the second control system, it is preferable that the adjustment of the power balance is performed under the same conditions in step S1 and step S3. Meanwhile, it is assumed that in step S3, the same power adjustment element as in step S1 is adjusted. That is, when the optical attenuator 13 and/or 23 is controlled in step S1, the optical attenuator 13 and/or 23 is controlled in step S3.

In step S4, the control result (init_adj_2) in step S3 is stored in a specified memory area. The control result to be stored is the setting value of the same power adjustment element as in step S2. Then, in step S5, a correction value (offset) representing the error between init_adj_1 stored in step S2 and init_adj_2 stored in step S4 is calculated and stored in a specified memory area. Thus, in steps S1-S5, the error between the first control system and the second control system is measured.

Steps S6-S7 are online control performed during the period in which the optical signal transmitter is transmitting data. In step S6, the correction value (offset) stored in step S5 is set in the second control system. In an example, the correction value (offset) is written into the memory area to which the controller 55 refers when the controller calculates the control signals C1-C3.

In step S7, the second control system adjusts the power balance using the correction value (offset). At this time, the phase shifters 11 and 21 are controlled to the optimal phase respectively. In addition, data X and Y are data streams transmitted to a receiving station.

For example, it is assumed that "10" is obtained as init_adj_1, and "9.3" is obtained as init_adj_2 in the offline control. In this case, "0.7" is obtained as the correction value (offset). Then, the optical signal transmitter compensates for the error between the first control system and the second control system using the correction value (offset) when the optical signal transmitter transmits data to the receiving station. For example, when init_adj_2 obtained in the second control system while data is being transmitted to the receiving station is "9.4", the controller 55 outputs "10.1(=9.4+0.7)" for adjusting the optical power adjustment element.

In the procedures described above, since the first control system is not subject to the characteristics of the polarization beam combiner 31 or the characteristics of the photo detectors 111 and 121, the accuracy of the control signal obtained in the first control system is high. In the control method according to the embodiment, the measured value in the second control system obtained during the data transmission is compensated for by the error between the first control system and the second control system. Therefore, according to the control method of the embodiment, the power difference between the X polarization and the Y polarization may be constantly controlled to be small to obtain good transmission quality.

Other Embodiments

Figure 19:
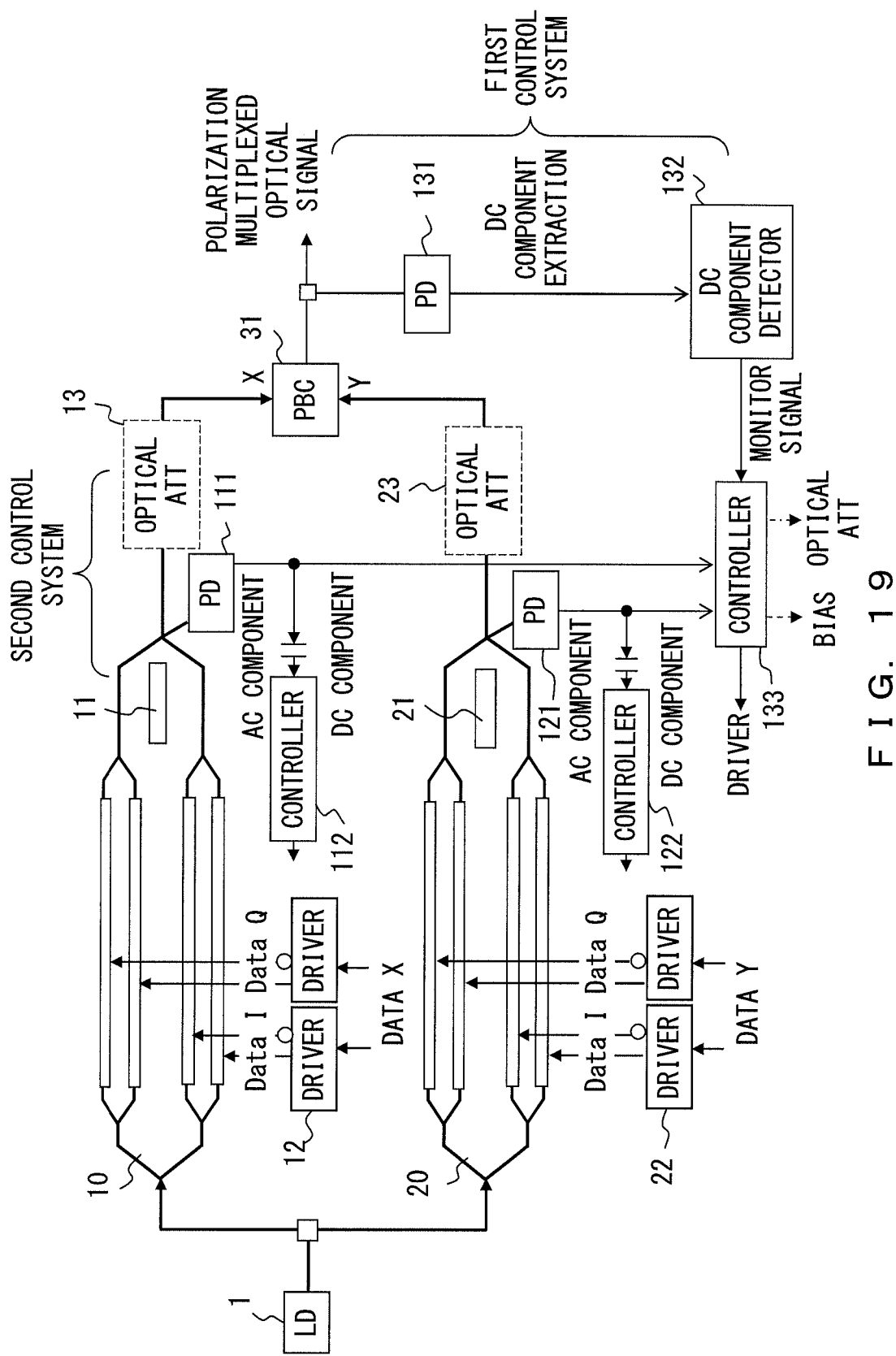
FIG. 19 is a diagram illustrating the configuration of an optical signal transmitter according to another embodiment.

FIG. 19 is a diagram illustrating another configuration of the optical signal transmitter. The second control system of the optical signal transmitter illustrated in FIG. 19 is, in this example, similar to the configuration illustrated in FIG. 17. However, the first control system illustrated in FIG. 19 is different from the first control system illustrated in FIG. 17.

The optical signal transmitter illustrated in FIG. 19 has a photo detector 131, a DC component detector 132, and a controller 133. The photo detector 131 converts a polarization multiplexed optical signal split by an optical splitter into an electric signal, in the same manner as the photo detector 51. The DC component detector 132 extracts the DC component of the electric signal obtained by the photo detector 131. The DC component is detected by, for example, integrating or averaging the input signal from the photo detector 131. Then, the DC component detector 132 outputs the detection result as a monitor signal representing the average power of the polarization multiplexed optical signal.

The controller 133 controls the power adjustment element (the bias of the modulators 10 and 20, the amplitude of the drive signal generated by the drivers 12 and 22, the attenuation amount of the optical attenuators 13 and 23, (the output optical power of the light sources 2 and 3)). Meanwhile, the controller 133 also provides the operation of the second control system.

Figure 20:
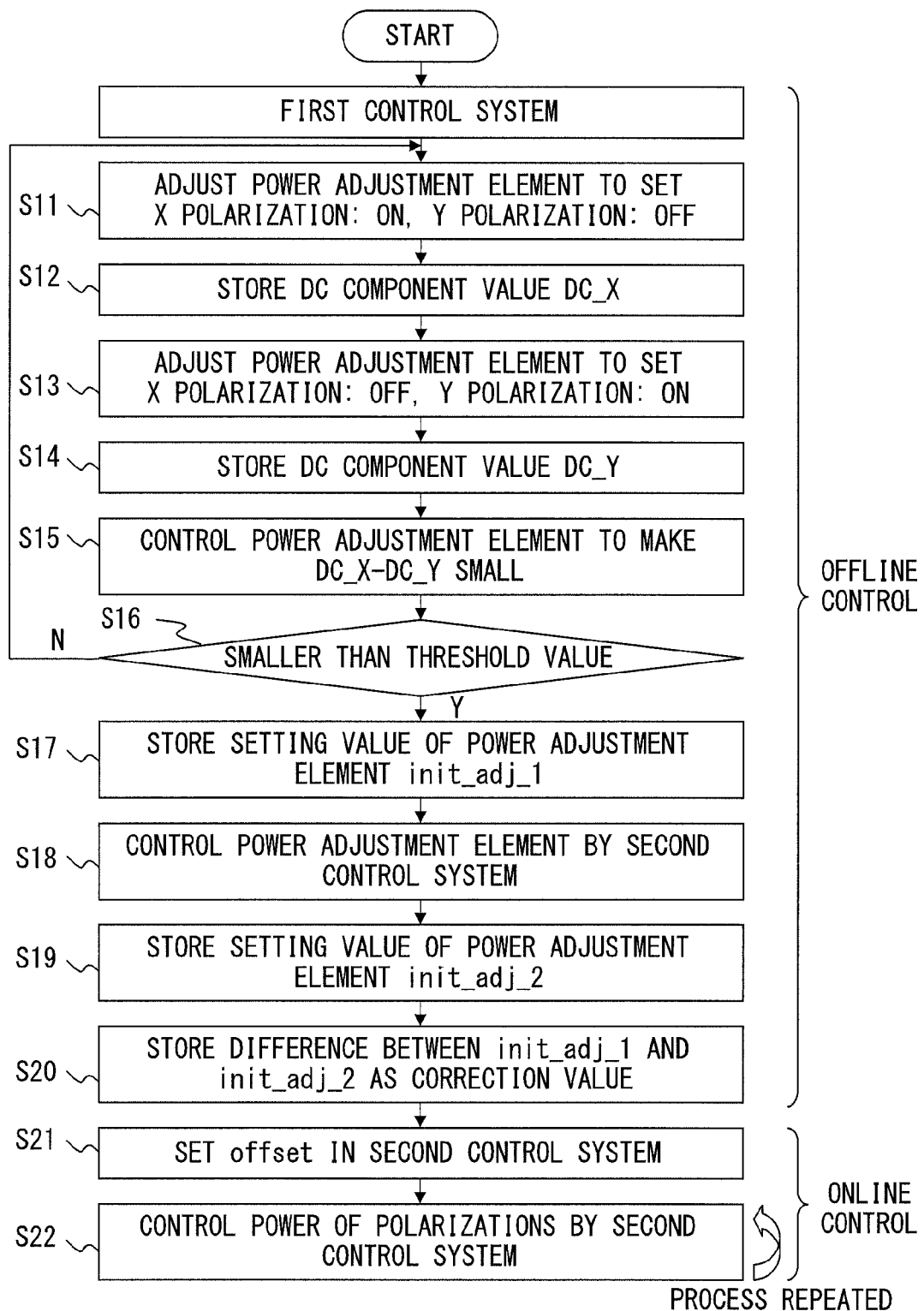
FIG. 20 is a flowchart illustrating the operation of the controller illustrated in FIG. 19.

FIG. 20 is a flowchart illustrating the operations of the controller 133 illustrated in FIG. 19. Steps S11-S20 are performed in the offline control. In this embodiment, the phase of the phase shifters 11 and 21 are maintained at the optimal phase in the offline control and the online control. That is, for example, in DQPSK, the phase shifters 11 and 21 are both maintained at $\pi/2$. In addition, data X and Y do not need to be the same as each other, and transmission data or arbitrary data patterns are input.

In step S11, the modulated optical signal X (X polarization) is controlled to be ON and the modulated optical signal Y (Y polarization) is controlled to be OFF by controlling the power adjustment element. "ON" indicates a state in which light is emitted, and "OFF" indicates a state in which no light is emitted. When the power adjustment element is the optical attenuators 13 and 23, for example, the attenuation amount of the optical attenuator 13 is controlled to minimum, and the attenuation amount of the optical attenuator 23 is controlled to maximum. At this time, the modulated optical signal X is hardly attenuated by the optical attenuator 13 and is guided to the polarization beam combiner 31. On the other hand, the modulated optical signal Y is fully attenuated by the optical attenuator 23, thus is not transmitted to the polarization beam combiner 31. Accordingly, the polarization multiplexed optical signal output from the polarization beam combiner 31 substantially includes only the X polarization. In step S12, the DC component DC_X detected by the DC component detector 132 is stored in a specified memory area. Here, since the polarization multiplexed optical signal substantially includes only the X polarization, the detected value (that is, DC_X) by the DC component detector 132 represents the power of the X polarization.

In step S13, the modulated optical signal X (X polarization) is controlled to be OFF, and the modulated optical signal Y (Y polarization) is controlled to be ON. In the example described above, the attenuation amount of the optical attenuator 13 is controlled to maximum, and the attenuation amount of the optical attenuator 23 is controlled to minimum. In step S14, the DC component DC_Y detected by the DC component detector 132 is stored. Meanwhile, in steps S13-S14, the polarization multiplexed optical signal output from the polarization beam combiner 31 substantially includes only the Y polarization. Therefore, the detected value DC_Y represents the power of the Y polarization.

In step S15, the power adjustment element is controlled so as to make the difference between the DC component DC_X and the DC component DC_Y small. For example, when "DC_X−DC_Y>0", control to increase the attenuation amount of the optical attenuator 13, and/or control to decrease the attenuation amount of the optical attenuator 23 is performed. Note that the controller 133 stores the latest setting value for the power adjustment element, and the stored setting value is updated in step S15.

In step S16, the difference obtained in step S15 and a specified threshold value are compared. The threshold value is a sufficiently small value. That is, in steps S16, whether or not the difference between the DC component DC_X and the DC component DC_Y has converged at approximately zero is determined. If the difference is larger than the threshold value, the process returns to step S11. In other words, steps S11-S15 are performed repeatedly until the difference becomes smaller than the threshold value. Then, when the difference becomes smaller than the threshold value, the updated setting value init_adj_1 of the power adjuster is stored in a specified memory area.

Next, in steps S18-S19, the power balance between the X polarization and the Y polarization is controlled using the second control system. The process is the same as steps S3-S4 illustrated in FIG. 18. That is, the setting value init_adj_2 obtained in the second control system is stored.

In step S20, a correction value (offset) representing the error between init_adj_1 stored in step S17 and init_adj_2 stored in step S19 is calculated and stored in a specified memory area. Thus, in steps S11-S20, the error between the first control system and the second control system is measured.

Figure 18:
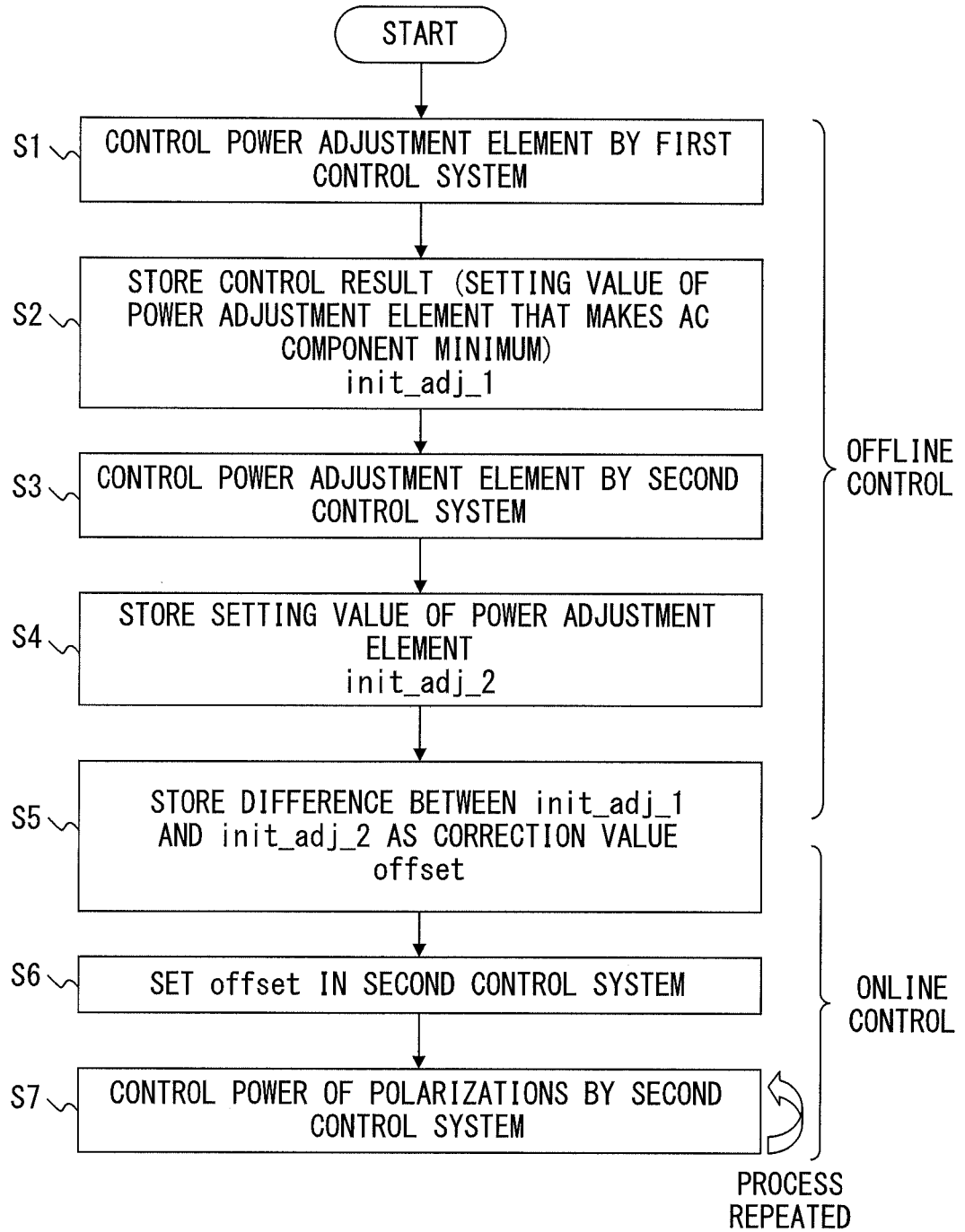
FIG. 18 is a flowchart illustrating the operation of the controller illustrated in FIG. 17.

Steps S21-S22 are online control, which are basically the same as steps S6-S7 illustrated in FIG. 18. That is, the correction value (offset) stored in step S20 is set in the second control system. Then, the second control system adjusts the power balance using the correction value (offset).

As described, in the configuration and method illustrated in FIG. 19-FIG. 20, there is no need to set a special phase (A−Δφ and A+Δφ) for the phase shifters to adjust the power balance between the X polarization and the Y polarization. That is to say, in this configuration, the shifters 12 and 13 may be controlled to be optimal phase even in the offline control procedure. In addition, in the configuration and method illustrated in FIG. 19-FIG. 20, there is no need to use particular data patterns as data X and Y to adjust the power balance between the X polarization and the Y polarization.

The offline control described above is performed, for example, at the initial setting of the control system or when the wavelengths are switched in the WDM system. The online control described above is repeated regularly, for example. Alternatively, the online control described above may be performed under a specified condition (for example, when the temperature of the optical transmitter changes).

In addition, the optical signal transmitter to transmit QPSK (including DQPSK) signal is described in the explanation above, the invention is not limited to this configuration. The optical signal transmitter according to the invention may be configured to transmit a modulated optical signal of another modulation scheme.

Furthermore, there is no particular limitation on the configuration or system of the receiver that receives the polarization multiplexed optical signal generated by the optical signal transmitter according to the embodiments. The receiver may be, for example, a digital coherent receiver, or may be a optical receiver using an interferometer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions has (have) been described in detail, it should be understood that the various changes, substitutions, and alterations could be made hereto without departing from the spirit and scope of the invention.

What is claimed is:

1. An optical signal transmitter comprising:
 a first modulator to generate a first modulated optical signal, the first modulator including a pair of optical paths and a first phase shifter to give a phase difference to the pair of optical paths;
 a second modulator to generate a second modulated optical signal, the second modulator including a pair of optical paths and a second phase shifter to give a phase difference to the pair of optical paths;
 a combiner to generate a polarization multiplexed optical signal by combining the first and second modulated optical signals;
 a phase controller to control the phase difference by the first phase shifter to A−Δφ and control the phase difference by the second phase shifter to A+Δφ when the first and second modulators are driven by first and second control data signals respectively; and
 a power controller to control at least one of the first and second modulators based on an AC component of the polarization multiplexed optical signal when the first and second modulators are driven by the first and second control data signals respectively;
 wherein a data pattern of the first control data signal is same as the second control data signal or reversed pattern of the second control data signal; and
 wherein A is an optimal phase determined according to a modulation scheme of the first and second modulator at a time of data transmission, and Δφ is an arbitrary phase other than zero.

2. The optical signal transmitter according to claim 1, wherein the power controller controls is configured to control at least one of the first and second modulators so as to make an average of the AC component of the polarization multiplexed optical signal small.

3. The optical signal transmitter according to claim 1, wherein
the first modulator includes a first driver circuit to generate a drive signal for generating the first modulated optical signal;
the second modulator includes a second driver circuit to generate a drive signal for generating the second modulated optical signal;
the first driver circuit is configured to generate a first drive signal from the first control data signal and the second driver circuit is configured to generate a second drive signal from the second control data signal, when the first and second control data signals are given to the first and second modulators, respectively; and
the power controller is configured to control an amplitude of at least one of the first and second drive signals.

4. The optical signal transmitter according to claim 1, wherein
the first modulator includes a first inner modulator to generate the first modulated optical signal using electro-optic effect;
the second modulator includes a second inner modulator to generate the second modulated optical signal using electro-optic effect; and
the power controller is configured to control a bias of at least one of the first and second inner modulators.

5. The optical signal transmitter according to claim 1, wherein
the first modulator includes a first optical attenuator;
the second modulator includes a second optical attenuator; and
the power controller is configured to control at least one of the first and second attenuators.

6. The optical signal transmitter according to claim 1, wherein
the first modulator includes a first phase modulator and a first intensity modulator serially connected to the first phase modulator;
the second modulator includes a second phase modulator and a second intensity modulator serially connected to the second phase modulator;
each of the first and second intensity modulators modulates an optical signal using electro-optic effect; and
the power controller configured to control a bias of at least one of the first and second intensity modulators.

7. The optical signal transmitter according to claim 1, wherein the power controller gives a low-frequency signal to the first and second modulators and is configured to control at least one of the first and second modulators based on the low-frequency signal component contained in the polarization multiplexed optical signal.

8. The optical signal transmitter according to claim 1, further comprising:
a first monitor to obtain a first monitor value representing an optical power of the first modulated optical signal output from the first modulator; and
a second monitor to obtain a second monitor value representing an optical power of the second modulated optical signal output from the second modulator, wherein
the phase controller is configured to control the phase difference by the first and second phase shifters to A when the first and second modulators are driven by first and second transmission data signals;
and the power controller is configured to correct a control signal controlling at least one of the first and second modulators so as to make the first and second monitor values approximately same as each other, according to a control result based on the AC component of the polarization multiplexed optical signal obtained when the first and second control data signals are used, when the first and second modulators are driven by the first and second transmission data signals.

9. An optical signal transmitter comprising:
a first light source;
a first modulator to generate a first modulated optical signal by modulating an optical signal generated by the first light source, the first modulator including a pair of optical paths and a first phase shifter to give a phase difference to the pair of optical paths;
a second light source;
a second modulator to generate a second modulated optical signal by modulating an optical signal generated by the second light source, the second modulator including a pair of optical paths and a second phase shifter to give a phase difference to the pair of optical paths;
a combiner to generate a polarization multiplexed optical signal by combining the first and second modulated optical signals;
a phase controller to control the phase difference by the first phase shifter to A−Δϕ and control the phase difference by the second phase shifter to A+Δϕ when the first and second modulators are driven by first and second control data signals respectively; and
a power controller to control at least one of the first and second light sources based on an AC component of the polarization multiplexed optical signal when the first and second modulators are driven by the first and second control data signals respectively;
wherein a data pattern of the first control data signal is same as the second control data signal or reversed pattern of the second control data signal; and
wherein A is an optimal phase determined according to a modulation scheme of the first and second modulator at a time of data transmission, and Δϕ is an arbitrary phase other than zero.

10. A method for controlling a polarization multiplexed optical signal in an optical signal transmitter including a first modulator having a pair of optical paths and a first phase shifter to give a phase difference to the pair of optical paths to generate a first modulated optical signal; a second modulator having a pair of optical paths and a second phase shifter to give a phase difference to the pair of optical paths to generate a second modulated optical signal; and a combiner to generate the polarization multiplexed optical signal by combining the first and second modulated optical signals, comprising:
controlling the phase difference by the first phase shifter to A−Δϕ;
controlling the phase difference by the second phase shifter to A+Δϕ;
generating first and second control data signals as drive signals of the first and second modulators, respectively; and
controlling at least one of the first and second modulators based on an AC component of the polarization multiplexed optical signal generated when the first and second modulators are driven by the first and second control data signals, respectively,
wherein a data pattern of the first control data signal is same as the second control data signal or reversed pattern of the second control data signal; and
wherein A is an optimal phase determined according to a modulation scheme of the first and second modulator at a time of data transmission, and Δϕ is an arbitrary phase other than zero.

11. A method for controlling a polarization multiplexed optical signal in an optical signal transmitter including a first modulator having a pair of optical paths and a first phase shifter to give a phase difference to the pair of optical paths to generate a first modulated optical signal; a second modulator having a pair of optical paths and a second phase shifter to give a phase difference to the pair of optical paths to generate a second modulated optical signal; and a combiner to generate the polarization multiplexed optical signal by combining the first and second modulated optical signals, comprising:

in a first period,
controlling the phase difference by the first phase shifter to $A-\Delta\phi$;
controlling the phase difference by the second phase shifter to $A+\Delta\phi$;
generating first and second control data signals as drive signals of the first and second modulators, respectively;
generating a first control parameter for controlling at least one of the first and second modulators so as to minimize an AC component of the polarization multiplexed optical signal; and
generating a second control parameter for controlling at least one of the first and second modulators so as to make optical powers of the first and second modulated optical signals approximately same as each other, wherein a data pattern of the first control data signal is same as the second control data signal or reversed pattern of the second control data signal, and wherein A is an optimal phase determined according to a modulation scheme of the first and second modulator at a time of data transmission, and $\Delta\phi$ is an arbitrary phase other than zero, and in a second period,
controlling the phase difference by the first and second phase shifters to A respectively,
generating first and second transmission data as drive signal of the first and second modulators; and
correcting the second control parameter based on an error between the first control parameter and the second control parameter, and controlling at least one of the first and second modulators by the corrected second control parameter.

* * * * *

UNITED STATES PATENT AND TRADEMARK OFFICE
CERTIFICATE OF CORRECTION

PATENT NO. : 8,472,810 B2
APPLICATION NO. : 12/839102
DATED : June 25, 2013
INVENTOR(S) : Yuichi Akiyama et al.

It is certified that error appears in the above-identified patent and that said Letters Patent is hereby corrected as shown below:

In the Claims:

In Col. 20, Line 64, In Claim 2, after "controller" delete "controls".

In Col. 21, Line 44, In Claim 6, delete "controller" and insert -- controller is --, therefor.

In Col. 22, Line 24, In Claim 9, delete "A+Aφ" and insert -- A+Δφ --, therefor.

Signed and Sealed this
Fifteenth Day of October, 2013

Teresa Stanek Rea
*Deputy Director of the United States Patent and Trademark Office*